US012562615B2

(12) United States Patent
Han et al.

(10) Patent No.: US 12,562,615 B2
(45) Date of Patent: Feb. 24, 2026

(54) MOTOR ASSEMBLY

(71) Applicant: LG MAGNA E-POWERTRAIN CO., LTD., Incheon (KR)

(72) Inventors: Seungdo Han, Incheon (KR); Sangjin Son, Incheon (KR); Sungjung Kim, Incheon (KR); Sohyeon Lee, Incheon (KR)

(73) Assignee: LG ELECTRONICS INC., Seoul (KR)

( * ) Notice: Subject to any disclaimer, the term of this patent is extended or adjusted under 35 U.S.C. 154(b) by 267 days.

(21) Appl. No.: 18/268,907

(22) PCT Filed: Oct. 28, 2021

(86) PCT No.: PCT/KR2021/015269
§ 371 (c)(1),
(2) Date: Jun. 21, 2023

(87) PCT Pub. No.: WO2022/139156
PCT Pub. Date: Jun. 30, 2022

(65) Prior Publication Data
US 2024/0048020 A1     Feb. 8, 2024

(30) Foreign Application Priority Data
Dec. 21, 2020     (KR) ........................ 10-2020-0180217

(51) Int. Cl.
H02K 5/20          (2006.01)
H02K 1/276        (2022.01)
(Continued)

(52) U.S. Cl.
CPC ............. H02K 5/203 (2021.01); H02K 1/276 (2013.01); H02K 9/193 (2013.01); H02K 21/14 (2013.01)

(58) Field of Classification Search
CPC ...... H02K 1/276; H02K 1/2766; H02K 21/14; H02K 5/203; H02K 9/10; H02K 9/193
(Continued)

(56) References Cited

U.S. PATENT DOCUMENTS 9,356,492 B2 *   5/2016   Chamberlin ........... H02K 5/203
9,966,818 B2 *   5/2018   Lee .......................... H02K 9/08
(Continued)

FOREIGN PATENT DOCUMENTS

DE        102014216693        2/2016
EP            2372881        10/2011
(Continued)

OTHER PUBLICATIONS

PCT International Application No. PCT/KR2021/015269, International Search Report dated Feb. 15, 2022, 6 pages.
(Continued)

*Primary Examiner* — Alex W Mok
(74) *Attorney, Agent, or Firm* — LEE, HONG, DEGERMAN, KANG & WAIMEY

(57)          ABSTRACT

A motor assembly including: a housing that forms an accommodating space therein; a stator that is provided inside the housing; and a rotor that is rotatable with respect to the stator, wherein the housing includes: a cooling water passage through which cooling water exchanges heat while moving therein; and an air flow passage through which air inside the accommodation space exchanges heat while moving through the housing in the axial direction. Accordingly, the air inside the housing can be cooled to a preset temperature or less.

12 Claims, 18 Drawing Sheets

(51) Int. Cl.
    *H02K 9/193*        (2006.01)
    *H02K 21/14*       (2006.01)

(58) Field of Classification Search
    USPC ........................................................ 310/54
    See application file for complete search history.

(56)           References Cited

U.S. PATENT DOCUMENTS

| | | | | |
|---|---|---|---|---|
| 10,215,085 | B2 * | 2/2019 | Yamashita | F04D 27/004 |
| 2014/0167536 | A1 * | 6/2014 | Hyun | H02K 5/203 |
| | | | | 310/54 |
| 2014/0354090 | A1 * | 12/2014 | Chamberlin | H02K 5/203 |
| | | | | 310/54 |
| 2016/0322874 | A1 | 11/2016 | Yoshinori et al. | |
| 2017/0328269 | A1 * | 11/2017 | Yamashita | F01P 3/20 |
| 2018/0287452 | A1 * | 10/2018 | Kim | H02K 5/203 |
| 2020/0244123 | A1 * | 7/2020 | Kang | H02K 9/19 |

FOREIGN PATENT DOCUMENTS

| | | | | | |
|---|---|---|---|---|---|
| EP | 2645544 | | 10/2013 | | |
| JP | 2011036122 | A * | 2/2011 | ............... | H02K 5/18 |
| KR | 19980043512 | A * | 9/1998 | | |
| KR | 100242152 | B1 * | 11/2000 | | |
| KR | 20090032206 | | 4/2009 | | |
| KR | 10-0914922 | | 8/2009 | | |
| KR | 10-1230154 | | 2/2013 | | |
| KR | 10-1772085 | | 8/2017 | | |
| KR | 20190086243 | A * | 7/2019 | | |
| KR | 10-2006189 | | 8/2019 | | |
| KR | 20200116299 | A * | 10/2020 | | |
| WO | 2008059687 | | 5/2008 | | |
| WO | 2013152473 | | 10/2013 | | |

OTHER PUBLICATIONS

European Patent Office Application Serial No. 21911223.2, Search Report dated Nov. 11, 2024, 10 pages.

* cited by examiner

MOTOR ASSEMBLY

CROSS-REFERENCE TO RELATED APPLICATIONS

This application is the National Stage filing under 35 U.S.C. 371 of International Application No. PCT/KR2021/015269, filed on Oct. 28, 2021, which claims the benefit of earlier filing date and right of priority to Korean Application No. 10-2020-0180217, filed Dec. 21, 2020, the contents of which are all hereby incorporated by reference herein in their entirety.

TECHNICAL FIELD

The present disclosure relates to a motor assembly.

BACKGROUND

As is well known, a motor is a device that converts electrical energy into mechanical energy.

The motor typically includes a stator and a rotor disposed to be rotatable relative to the stator.

The stator may include a stator core and a stator coil wound around the stator core.

The rotor includes a rotational shaft, a rotor core coupled to the rotational shaft, and a magnetic force generating unit capable of generating rotational force by interacting with magnetic force generated by the stator coil.

A portion of the magnetic force generating unit is configured with permanent magnets.

Another portion of the magnetic force generating unit is configured with a magnet coil.

The motor is implemented as a motor assembly that includes a housing defining an accommodation space in which the stator and the rotor are accommodated.

With this configuration, when power is applied to the stator coil, a magnetic field is generated by the stator coil. The rotor rotates centering on the rotational shaft by interaction between the magnetic field generated by the magnetic force generating unit and the magnetic field generated by the stator coil.

In the motor assembly, a temperature of the housing may rise due to electrical resistance heat of the stator coil during operation, and an resulting in reduction of output when the temperature of the housing rises excessively.

Considering this problem, the motor assembly may use a so-called air-cooling method that cools the housing by promoting movement of air inside the housing to reduce an internal temperature of the housing.

However, in the air-cooled motor assembly, there is a limit to cooling a large-capacity motor assembly generating a large amount of heat, due to a small specific heat capacity in view of characteristics of air.

Another motor assembly may use a so-called water-cooling method using cooling water for a cooling operation.

However, in the water-cooled motor assembly, a cooling water passage is formed in the housing in order to separate the cooling water from electric components, which causes a limit to cooling a coil end of the stator coil that generates a relatively large amount of heat and has a relatively high temperature.

In addition, the rotor is spaced relatively far from the cooling water passage of the housing. Due to this structure, when temperature is excessively increased, magnetic force of permanent magnets of the rotor is reduced, resulting in a decrease in output.

Considering this problem, in the motor assembly with a relatively high internal temperature, the permanent magnets may be made to contain expensive heavy rare earth elements to secure high coercive force characteristics at a relatively high temperature. However, this causes a significant increase in manufacturing cost.

Accordingly, an aspect of the present disclosure is to provide a motor assembly capable of cooling permanent magnets of a rotor to a preset temperature or less.

Another aspect of the present disclosure is to provide a motor assembly capable of reducing or suppressing the use of high-priced heavy rare earth elements.

Still another aspect of the present disclosure is to provide a motor assembly capable of increasing an amount of heat exchange between cooling water and air circulating inside a housing.

To achieve these and other aspects of the present disclosure, a motor assembly is configured such that air circulating inside a housing can be cooled by cooling water.

Specifically, a housing enclosing a stator and a rotor may include cooling water passages and air flow passages in which air circulating inside the housing is cooled through heat exchange with cooling water flowing in the cooling water passages, thereby cooling the inside of the housing to a preset temperature or less.

This can prevent a reduction of an output of the motor assembly due to an excessive increase in internal temperature of the housing.

The rotor includes a rotational shaft, a rotor core coupled to the rotational shaft, and permanent magnets disposed on the rotor core.

With the configuration of the disclosed embodiments, the rotor and the permanent magnets can be maintained at a preset temperature or less. This can result in reducing a usage amount of or removing altogether the use of high-priced heavy rare earth elements, which are added to maintain high coercive force at the preset temperature or higher. Therefore, manufacturing cost of the permanent magnets can be reduced remarkably. More specifically, in existing configurations, the permanent magnet contains much higher-priced heavy rare earth elements, compared to light rare earth elements, to secure high coercive force at a relatively high specific temperature (e.g., 140° C.) or higher. This causes a manufacturing cost of the permanent magnet to be significantly increased.

In one embodiment of the present disclosure, the motor assembly includes: a housing defining an accommodation space therein; a stator disposed inside the housing; and a rotor disposed to be rotatable relative to the stator, and the housing includes: cooling water passages in which cooling water moves and exchanges heat; and air flow passages in which air inside the accommodation space moves through the housing in an axial direction and exchanges heat.

The housing is cooled by heat exchange with the cooling water, and air inside the housing is cooled by heat exchange with the housing while passing through the air flow passage.

As the air inside the housing is cooled by the heat exchange with the cooling water, the inside of the housing can be maintained at a preset temperature or less.

In an embodiment of the present disclosure, the rotor and the permanent magnet can be maintained at a preset temperature (e.g., 130° C.) or less by cooled air, thereby significantly reducing or eliminating the use of heavy rare earth elements.

In one embodiment of the present disclosure, the housing includes a housing body with both sides open and provided with the cooling water passages and the air flow passages, and covers coupled to both end portions of the housing body, respectively, and each of the air flow passages includes a plurality of axial sections spaced apart from one another in a circumferential direction of the housing body.

Accordingly, air at one side in the housing can be introduced into the air flow passage in the axial direction and cooled while moving along the axial section of the air flow passage. The cooled air can be discharged to another side in the housing.

The cooled air discharged to the another side in the housing comes into contact with the stator and the rotor and exchanges heat with the stator and the rotor so as to cool the stator and the rotor through heat exchange. The air increased in temperature due to the heat exchange with the stator and the rotor is cooled while passing through the air flow passage. This series of processes is repeatedly performed. Accordingly, a temperature rise of the stator and the rotor can be significantly suppressed.

In one embodiment of the present disclosure, the cooling water passages are formed through the housing body in the axial direction, and the cooling water passages and the air flow passages are alternately disposed in the circumferential direction of the housing.

Accordingly, since the cooling water passages are disposed at both sides of the air flow passage, cooling of air inside the air flow passage can be promoted.

In one embodiment of the present disclosure, the housing body includes an inner wall in which the accommodation space is defined, an outer wall concentrically spaced apart from an outer side of the inner wall, and a plurality of barrier ribs connecting the inner wall and the outer wall.

Accordingly, the air flow passage is disposed parallel to the cooling water passage with the barrier rib interposed therebetween, and air inside the air flow passage can be rapidly cooled by exchanging heat with cooling water inside the cooling water passage through the barrier rib.

In one embodiment of the present disclosure, the barrier rib extends in the axial direction.

The housing may be formed by extrusion.

With this configuration, the housing can be easily manufactured, and thus a manufacturing cost can be remarkably reduced.

In one embodiment of the present disclosure, each of the cooling water passages includes a first section in which cooling water moves in a first direction and a second section in which the cooling water moves in a second direction opposite to the first direction, and the first section and the second section are disposed side by side with the barrier rib interposed therebetween.

In one embodiment of the present disclosure, the covers include a front cover disposed on a front end portion of the housing body and a rear cover disposed on a rear end portion of the housing body.

The front cover includes a first return part through which the cooling water in the first section moves to the second section.

The rear cover includes a second return part through which the cooling water in the second section moves to the first section.

This can further extend a length of the cooling water passage, so as to increase an amount of heat exchange between the cooling water and the air.

In addition, the cover can be cooled by contact with the cooling water, which can further facilitate the cooling of the air inside the housing that comes into contact with the cover.

In one embodiment of the present disclosure, a length of the second return part is longer than a length of the first return part in the circumferential direction of the housing.

This can facilitate the cooling of the air that is in contact with the second return part and the rear cover.

In one embodiment of the present disclosure, the second section and the first section are spaced apart from each other by a preset distance in the circumferential direction of the housing.

In one embodiment of the present disclosure, the air flow passage is defined between the second section and the first section.

Accordingly, the air that moves along the air flow passage can be cooled by the cooling water that moves along the second section and the first section.

In one embodiment of the present disclosure, the first return part includes a first section communicating portion communicating with the first section, a second section communicating portion communicating with the second section, and a connecting portion connecting the first section communicating portion and the second section communicating portion.

Accordingly, the cooling water which has moved along the first section moves to the second section via the first section communicating portion, the connecting portion, and the second section communicating portion.

The second return part includes a second section communicating portion communicating with the second section, a first section communicating portion communicating with the first section, and a connecting portion connecting the second section communicating portion and the first section communicating portion.

Accordingly, the cooling water which has moved along the second section moves to the first section via the second section communicating portion, the connecting portion, and the first section communicating portion.

In one embodiment of the present disclosure, the connecting portion of the second return part has a cross-sectional shape that is convex outward to be located outside the air flow passage in the radial direction.

This can prevent resistance during the movement of the air and further facilitate the cooling of the air.

In one embodiment of the present disclosure, the first sections and the second sections are alternately disposed in an entire circumference of the housing in the circumferential direction of the housing. A cooling water inlet through which the cooling water flows in is disposed in an end portion of the first section connected to a foremost first return part among the first return parts, and a cooling water outlet through which the cooling water flows out is disposed in an end portion of the second section connected to a last first return part among the first return parts.

With the configuration, the cooling water introduced into the first section through the cooling water inlet moves to the second section through the first return part and moves to the first section through the second return part. Through repetition of this process, the cooling water moves along the last second section in the circumferential direction of the housing via an entire circumferential surface of the housing and then is discharged from the last second section through the cooling water outlet.

In an embodiment of the present disclosure, the motor assembly may be mounted as a driving source in a vehicle, and the cooling water inlet and the cooling water outlet may be connected to a circulation passage of the cooling water. A radiator may be disposed in the circulation passage of the cooling water to accelerate cooling of the cooling water. The cooling water cooled by the radiator is introduced into the cooling water passage of the housing through the cooling water inlet to cool the housing, and then moves to the cooling water circulation passage through the cooling water outlet to be cooled in the radiator. While this series of processes is carried out, the housing can be cooled.

In one embodiment of the present disclosure, the housing body includes an inner housing having the accommodation space defined at an inner side thereof and the cooling water passages defined at an outer side, and an outer housing concentrically coupled to be in surface contact with an outer surface of the inner housing and having the air flow passages.

This can significantly increase a cross-sectional area of the air flow passage so as to remarkably increase an amount of air inside the housing that flows via the air flow passage.

With this configuration, the heat exchange between the cooling water and the air can be remarkably increased, so as to facilitate the cooling of the air inside the housing, thereby significantly suppressing a temperature rise of the air inside the housing and maintaining the air in the housing at a much lower temperature.

Accordingly, the permanent magnet can be maintained at a relatively low temperature, which can result in significantly reducing or excluding the use of heavy rare earth elements, which are added to suppress a decrease in coercive force when the temperature rises.

In one embodiment of the present disclosure, the cooling water passages are recessed from the outer surface of the inner housing and extend spirally.

This can further increase a ratio of cross-sectional area of the cooling water passage to a surface area of the cooling water and the inner surface of the inner housing.

With this configuration, the heat exchange between the inner housing and the cooling water can be further increased, so that a rise in temperature of the inner housing can be further suppressed.

In one embodiment of the present disclosure, each of the cooling water passages has an outer opening open outward in a radial direction of the inner housing, and the outer surface of the inner housing is in contact with an inner surface of the outer housing to block the outer opening of the cooling water passage.

This can further facilitate the heat exchange between the cooling water flowing through the cooling water passage of the inner housing and the outer housing.

According to this configuration, a heat transfer path between the cooling water in the cooling water passage and the air in the air passage can be further shortened, thereby further facilitating the heat exchange.

In one embodiment of the present disclosure, the air flow passages are formed through the outer housing in the axial direction.

Therefore, the outer housing may be formed by extrusion.

With this configuration, the outer housing can be easily manufactured, and thus a manufacturing cost can be remarkably reduced.

In one embodiment of the present disclosure, each of the air flow passages has therein ribs protruding in the radial direction and extending in the axial direction.

This can increase a heat exchange area between the air inside the air flow passage and the outer housing, so that the cooling of the air can be accelerated.

In one embodiment of the present disclosure, the rotor core includes penetrating parts formed therethrough in the axial direction.

Therefore, the air from one side of the rotor core can move to another side of the rotor core along the axial direction.

According to this configuration, circulation of the air inside the housing can be promoted.

In one embodiment of the present disclosure, the rotor core includes permanent magnet insertion parts formed therethrough in the axial direction such that the permanent magnets are inserted, end rings for blocking the permanent magnets are disposed respectively on both end portions of the rotor core in the axial direction. Each of the end rings includes communication portions communicating with the penetrating parts.

Accordingly, air existing on one side of the rotor core inside the housing in the axial direction can move toward another side of the rotor core via the communicating portion, the penetrating part, and the communicating portion.

In one embodiment of the present disclosure, any one of the end rings includes a plurality of blades to promote movement of air during rotation.

According to this configuration, circulation of the air inside the housing can be promoted.

In one embodiment of the present disclosure, the plurality of blades protrudes from a surface of the end ring in the axial direction and extend in the radial direction.

In one embodiment of the present disclosure, each of the plurality of blades includes an inclined surface that is inclined in the axial direction so that air can be discharged to one side in the axial direction during the rotation of the rotor. Here, the plurality of blades is configured such that air is discharged outward in the axial direction during rotation.

Accordingly, when the rotor rotates, air can be suctioned through the communicating portion and the penetrating part of the rotor by each of the plurality of blades and discharged to the outside by the plurality of blades.

With this configuration, circulation of the air inside the housing can be promoted.

In one embodiment of the present disclosure, the cover includes guide portions protruding from an inner surface thereof and extending in the radial direction.

Accordingly, when the rotor rotates, air discharged in the axial direction by the plurality of blades moves outward in the radial direction by the guide portions of the cover, is cooled by being introduced into one side of the air flow passage of the housing, and then is discharged to another side of the air flow passage.

The cooled air discharged to the another side of the air flow passage moves to the center of the housing by the guide portion of the cover, cools the rotor by being suctioned through the penetrating part of the rotor, and moves to the another side of the rotor. While this series of processes is repeatedly carried out, the rotor can continuously be cooled, so that the permanent magnets of the rotor can be maintained at a preset temperature or less.

In one embodiment of the present disclosure, the stator includes a stator core, and a stator coil wound around the stator core, the stator coil includes coil ends protruding from both end portions of the stator core in the axial direction, and each of the coil ends includes a molded part molded by a thermal conductive member.

The thermal conductive member may be made of, for example, a material having electrical insulation and excellent thermal conductivity.

The molded part is formed in a tube shape by being filled between wires of the coil end and covering an entire outer surface of the coil end.

Accordingly, an amount of air (air layer) existing between the wires of the coil end can be reduced, to suppress an excessive increase in temperature of the wires by an insulation using the air existing between the wires.

With this configuration, heat of the coil end (wires) can be dissipated relatively quickly through the molded part, thereby remarkably suppressing an excessive temperature rise.

As described above, according to one embodiment of the present disclosure, the housing includes the cooling water passages and the air flow passages capable of exchanging heat with the cooling water passages, so that the inside of the housing can be maintained at a preset temperature or less.

This can suppress an output of the motor assembly from being lowered due to adverse effects of a high temperature.

This can also significantly reduce or eliminate the need for the use of high-priced heavy rare earth elements, which are typically added to suppress a reduction of coercive force when the temperature of the permanent magnet rises. Therefore, a manufacturing cost of the permanent magnets can be reduced remarkably.

In addition, since the housing has the cooling water passages and the air flow passages formed therethrough in the axial direction, the housing can be easily manufactured by extrusion.

Since the cooling water passages and the air flow passages are alternately disposed along the circumferential direction of the housing, the heat exchange between air inside the air flow passages and cooling water in the cooling water passages can be promoted.

As the cooling water passage includes the first section through which the cooling water moves in the first direction and the second section through which the cooling water moves in the second direction, the front cover includes the first return part through which the first section and the second section communicate with each other, and the rear cover includes the second return part through which the second section and the first section communicate with each other, a length of the cooling water passage can extend, thereby increasing an amount of heat exchange between the cooling water and the air.

Also, since the cooling water passes through the cover, the cover is cooled. This can further facilitate the cooling of the air inside the housing in contact with the cover.

In addition, the connecting portion of the second return part has a cross-sectional shape that is convex outward to be located outside the air flow passage in the radial direction and is disposed at the outside of the air flow passage. This can suppress an increase in resistance when air moves and thus facilitate the cooling of air.

The housing body includes the inner housing in which the cooling water passages are formed and the outer housing concentrically coupled to be in surface contact with the outer surface of the inner housing and having the air flow passages. This structure can remarkably increase a heat exchange area between the cooling water and the air. Accordingly, the cooling of the air can be promoted, thereby remarkably suppressing a temperature rise of the air.

In addition, the cooling water passage has the outer opening that is open to the outside in the radial direction, and the outer opening is blocked by the inner surface of the outer housing, so that the heat exchange between the cooling water and the air can be further promoted.

Since the air flow passage is formed through the outer housing in the axial direction, the outer housing can be easily manufactured by extrusion.

Since each of the air flow passages is provided with the ribs protruding in the radial direction and extending in the axial direction, the heat exchange of the air may be further promoted.

Since the rotor core is provided with the penetrating part formed therethrough in the axial direction, air on one of the end portions of the rotor core can move to the other end portion in the axial direction, thereby facilitating the circulation of the air inside the housing.

The rotor core is provided with end rings on both end portions in the axial direction, and each of the end rings includes the communicating portion that communicates with the penetrating part, which can allow the air in the housing to move smoothly.

One of the end rings (or all of the end rings) includes the plurality of blades that promotes movement of air during rotation. Accordingly, air existing on one side of the rotor can move to another side of the rotor in the axial direction during rotation of the rotor.

Since the cover is provided with the guide portions protruding from the inner surface thereof and extending in the radial direction, the movement of air inside the housing can be promoted.

Since the coil end of the stator coil includes a molded part molded by a thermal conductive member, an amount of air between wires of the coil end can be remarkably reduced and thermal energy of the coil end can be dissipated relatively rapidly through the molded part, thereby significantly suppressing a temperature rise of the coil end.

DETAILED DESCRIPTION

Figure 1:
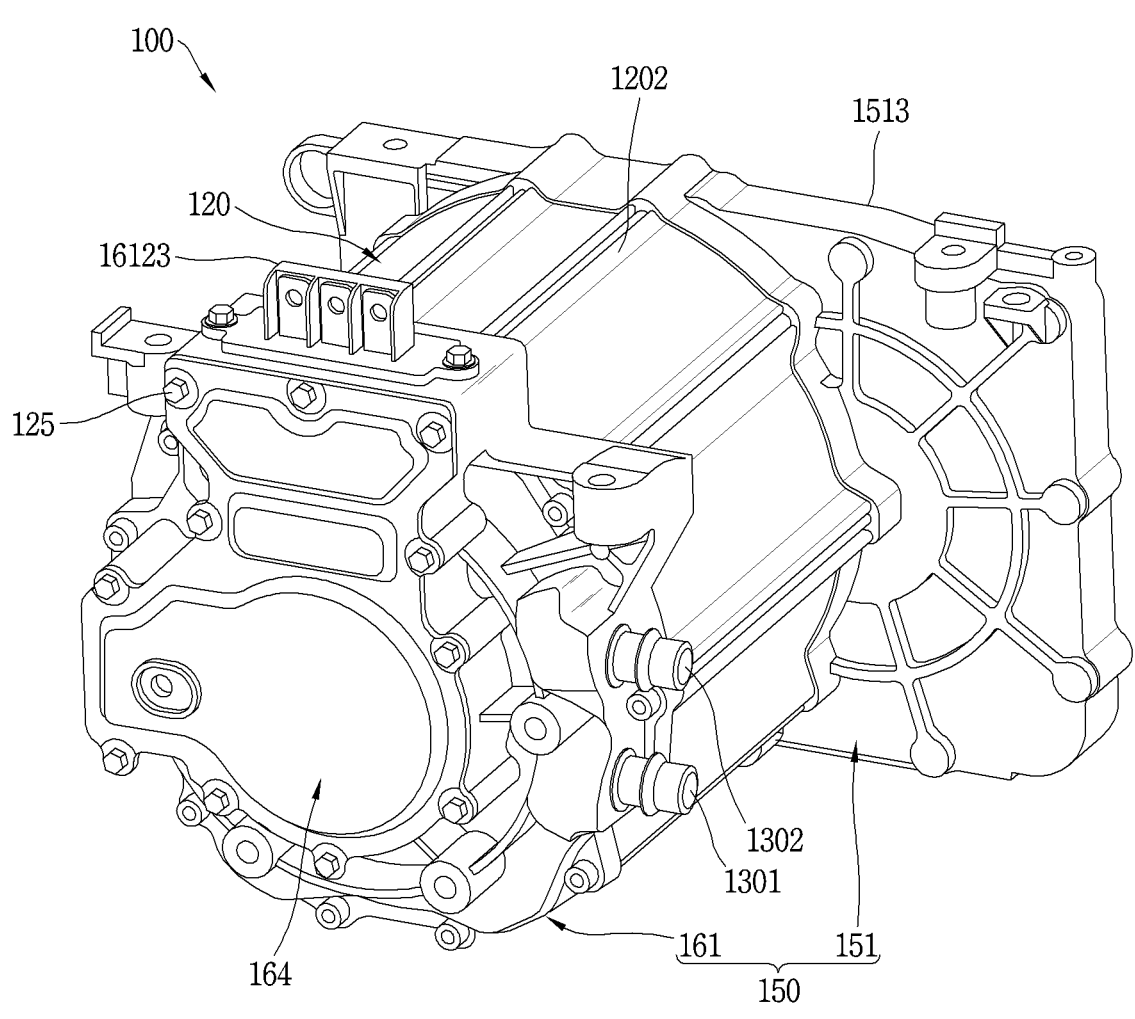
FIG. 1 is a perspective view of a motor assembly in accordance with one embodiment of the present disclosure.

Hereinafter, embodiments of the present disclosure will be described in detail with reference to the accompanying drawings. For the sake of brief description with reference to the drawings, the same or equivalent components will be provided with the same reference numerals, and description thereof will not be repeated. A singular representation used herein may include a plural representation unless it represents a definitely different meaning from the context. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings.

Figure 2:
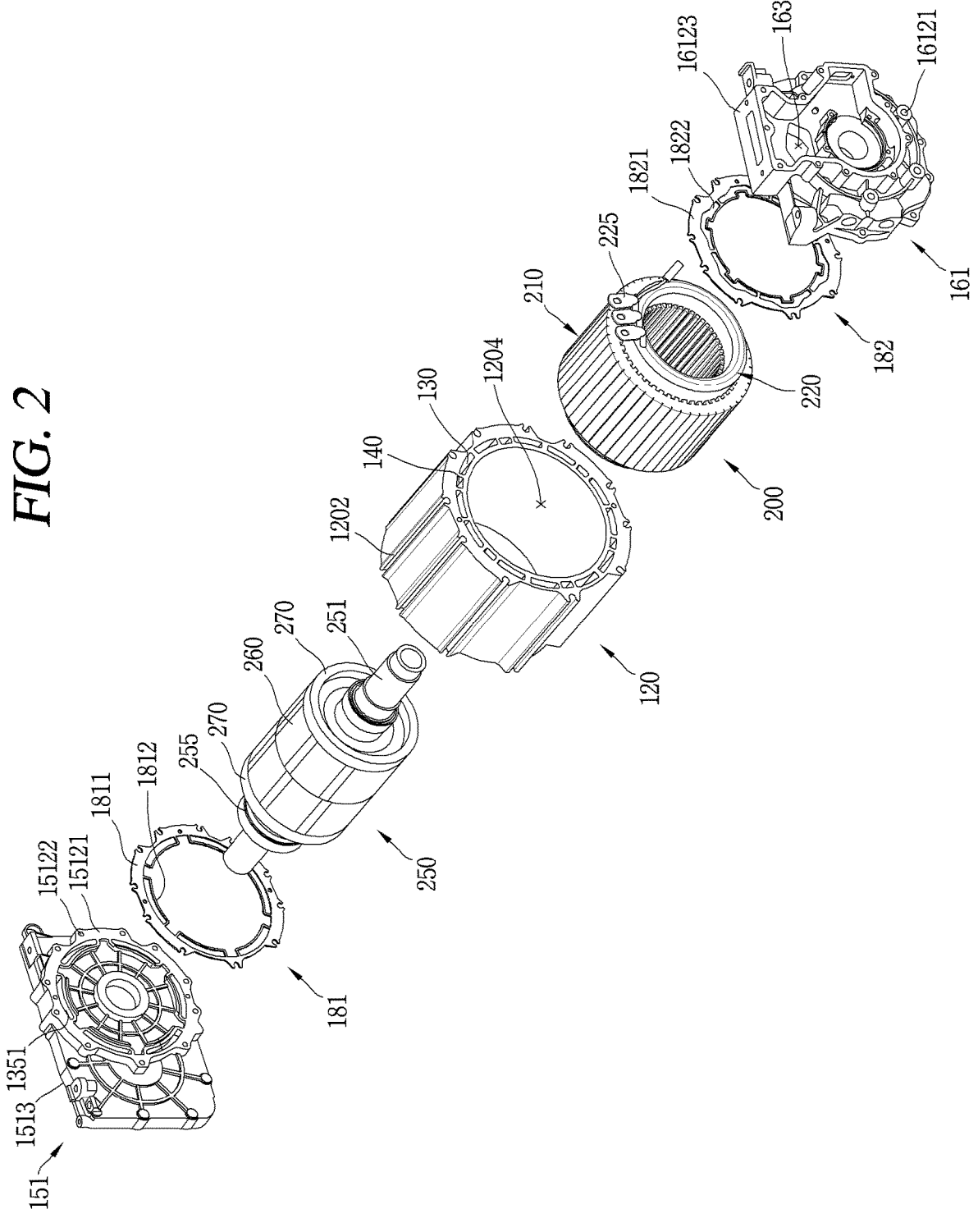
FIG. 2 is an exploded perspective view of the motor assembly of FIG. 1.

FIG. 1 is a perspective view of a motor assembly in accordance with one embodiment of the present disclosure, and FIG. 2 is an exploded perspective view of the motor assembly of FIG. 1. As illustrated in FIGS. 1 and 2, a motor assembly according to this embodiment includes a housing 110, a stator 200, and a rotor 250.

The housing 110 defines an accommodation space 1204 therein.

Specifically, the housing 110 includes a housing body 120 in which the accommodation space 1204 is defined, and covers 150 coupled to both end portions of the housing body 120, respectively.

The housing body 120 is implemented in, for example, a cylindrical shape with openings on both sides.

The housing body 120 has, for example, an inner surface (inner diameter surface) having a preset diameter.

The motor assembly according to the embodiment of the present disclosure, for example, may be implemented as a driving source that is coupled to a vehicle and provides power for driving of the vehicle.

The covers 150 may include, for example, a front cover 151 coupled to a front end portion of the housing body 120 and a rear cover 161 coupled to a rear end portion of the housing body 120.

Although not specifically illustrated in the drawing, the front cover 151 may include a gear box accommodating a plurality of gears connected to the motor assembly.

The front cover 151, for example, may be implemented in a rectangular plate shape to be coupled to the gear box. This embodiment illustrates that the front cover 151 is formed in the rectangular plate shape to be coupled to the gear box, but it is merely illustrative. The front cover 151 may alternatively be formed in a disk shape.

A plurality of fastening member accommodating portions 1202, in which a plurality of fastening members 125 for fastening the front cover 151 and the rear cover 161 are respectively accommodated, is disposed at an outer surface of the housing body 120. The plurality of fastening members 125 may be implemented as, for example, bolts and nuts. The plurality of fastening member accommodating portions 1202 are spaced apart from one another along a circumferential direction. Each of the plurality of fastening member accommodating portions 1202 is formed through the housing body 120 in an axial direction.

A terminal block 16123 is disposed at an upper surface of the rear cover 161.

The rear cover 161 is provided with a penetrating part 163 formed rearward therethrough.

This can facilitate separation and assembly of terminals 225 of a stator coil 220 to be described later, which are disposed in the terminal block 16123.

A penetrating part cover 164 that is coupled to cover the penetrating part 163 is disposed on the rear cover 161.

The stator 200 is accommodated in the housing body 120.

The stator 200 includes, for example, a stator core 210 and a stator coil 220 wound around the stator core 210.

The stator core 210 is implemented in a cylindrical shape.

The stator core 210 has an outer surface with a preset diameter (outer diameter).

The outer surface of the stator core 210 may be coupled to be in surface-contact with an inner surface of the housing body 120. Accordingly, a heat exchange between the stator core 210 and the housing body 120 can be smoothly performed.

The stator core 210 may be, for example, press-fitted into the housing body 120.

The stator core 210 is formed by stacking a plurality of electrical steel sheets 212 each having a rotor accommodating hole 2121 therein. Accordingly, since the electrical steel sheets of the stator core 210 are insulated, a flow of current between the electrical steel sheets is suppressed. Each of the plurality of electrical steel sheets 212 includes a plurality of teeth 2123 and slots 2122 that are alternately formed on a circumference of the rotor accommodating hole 2121.

The stator coil 220 is wound through the slots 2122.

The stator coil 220 includes a plurality of phase coils to which, for example, three-phase AC power can be applied. A plurality of terminals 225 (U-phase terminal, V-phase terminal, and W-phase terminal) connected to respective phases (U-phase, V-phase, and W-phase) of the three-phase AC power source is disposed on one side of the stator coil 220.

The rotor 250 is rotatably accommodated inside the stator core 210 with a predetermined air gap G.

The rotor 250 includes, for example, a rotational shaft 251, and a rotor core 260 coupled to the rotational shaft 251.

The rotor core 260 is formed by stacking a plurality of electrical steel sheets 2601 in an insulating manner.

Since each electrical steel sheet 2601 of the rotor core 260 is insulated, a flow of current between the electrical steel sheets is suppressed.

The rotor core 260 includes a plurality of permanent magnets 265.

The rotational shaft 251 is provided with bearings 255 rotatably supporting the rotational shaft 251.

The bearings 255 are respectively disposed on both sides of the rotor core 260, for example.

The bearings 255 may be implemented as, for example, a ball bearing.

Each of the bearings 255 includes, for example, an outer ring 2551, an inner ring 2552 concentrically disposed inside the outer ring 2551, and a plurality of rings disposed between the outer ring 2551 and the inner ring 2552.

Meanwhile, a cooling water passage 130 through which cooling water flows is formed in the housing 110. Accordingly, the housing 110 can be cooled by heat exchange with the cooling water.

Although not specifically illustrated in the drawings, the cooling water passage 130 of the housing 110 may be connected to a radiator of the vehicle that is capable of cooling the cooling water. As a result, the cooling water having increased temperature by the heat exchange with the housing 110 is cooled by exchanging heat with the radiator. The cooling water that has been cooled in the radiator moves into the housing 110 and exchanges heat with the housing 110. This operation is repeatedly performed so as to cool the housing 110.

The housing 110 includes an air flow passage 140 through which air in the accommodation space 1204 exchanges heat (is cooled) while passing through the housing 110 in the axial direction. Accordingly, a temperature of air inside the housing 110 can be maintained at a preset temperature or less.

Here, the preset temperature may be, for example, a temperature at which a temperature of the permanent magnet 265 of the rotor 250 can be maintained at 140° C. or less.

Accordingly, the temperature of the air inside the housing 110 may be set to a temperature lower than 140° C.

The permanent magnet 265 may be implemented as, for example, a magnet made of light rare earth elements (e.g., Neodymium).

In an embodiment of the present disclosure, the permanent magnet 265 may be implemented as a magnet made of light rare earth elements (e.g., Nd: Neodymium), without adding heavy rare earth elements (e.g., Tb: Terbium, Dy: Dysprosium), typically added to maintain high coercive force at a temperature equal to or higher than the preset temperature of 140° C.

For reference, since the price of the heavy rare earth elements is typically tens to hundreds of times higher than the price of the light rare earth elements, compared to the same weight, a manufacturing cost of the permanent magnet may significantly increase when the heavy rare earth elements are included. Therefore, when the heavy rare earth elements are not included, the manufacturing cost of the permanent magnet 265 can be significantly reduced.

Gaskets 180 are disposed between the housing 110 and the covers 150.

This can suppress leakage of the cooling water through gaps between the housing 110 and the covers 150.

Figure 3:
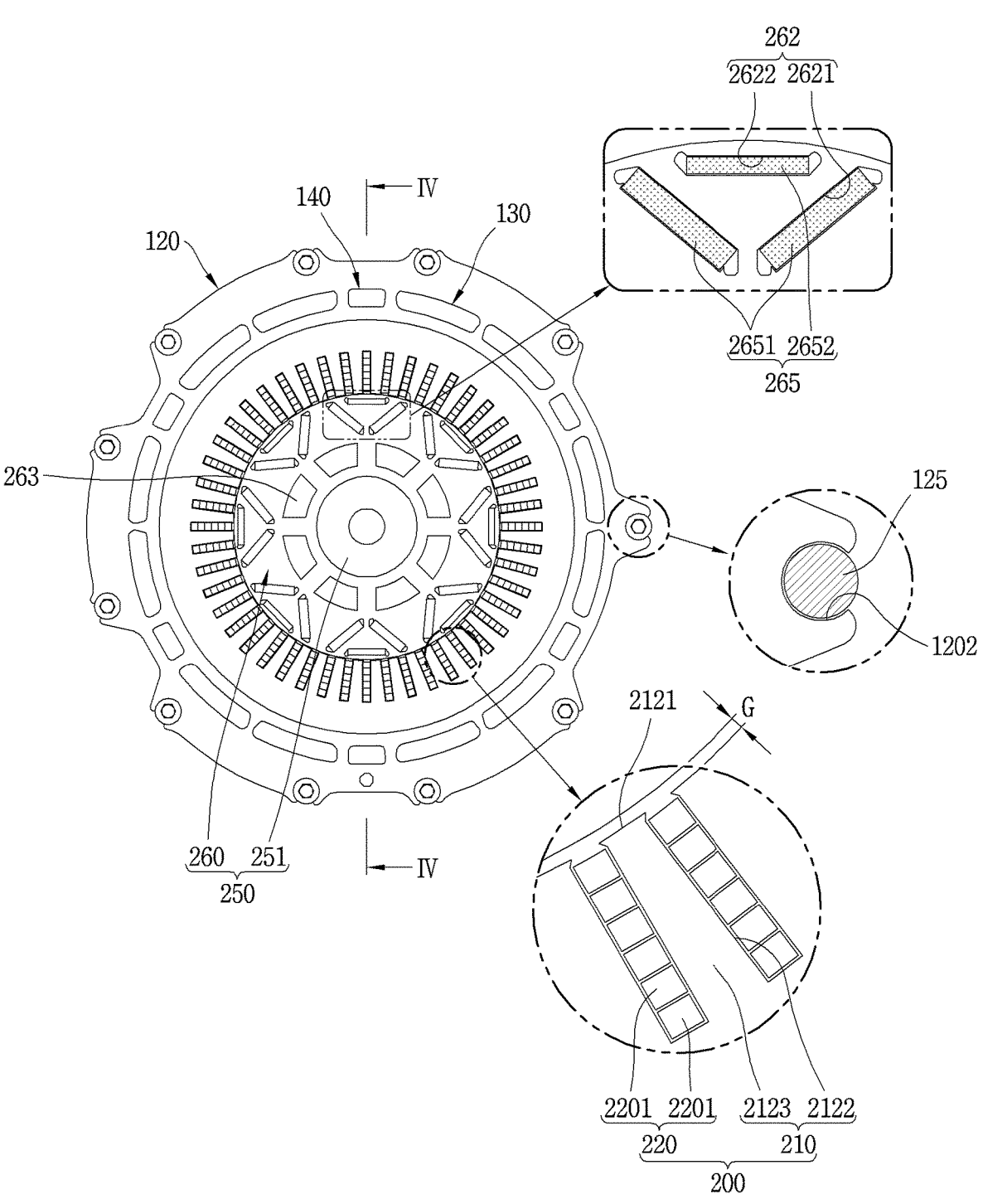
FIG. 3 is a cross-sectional view of the motor assembly of FIG. 1.
Figure 4:
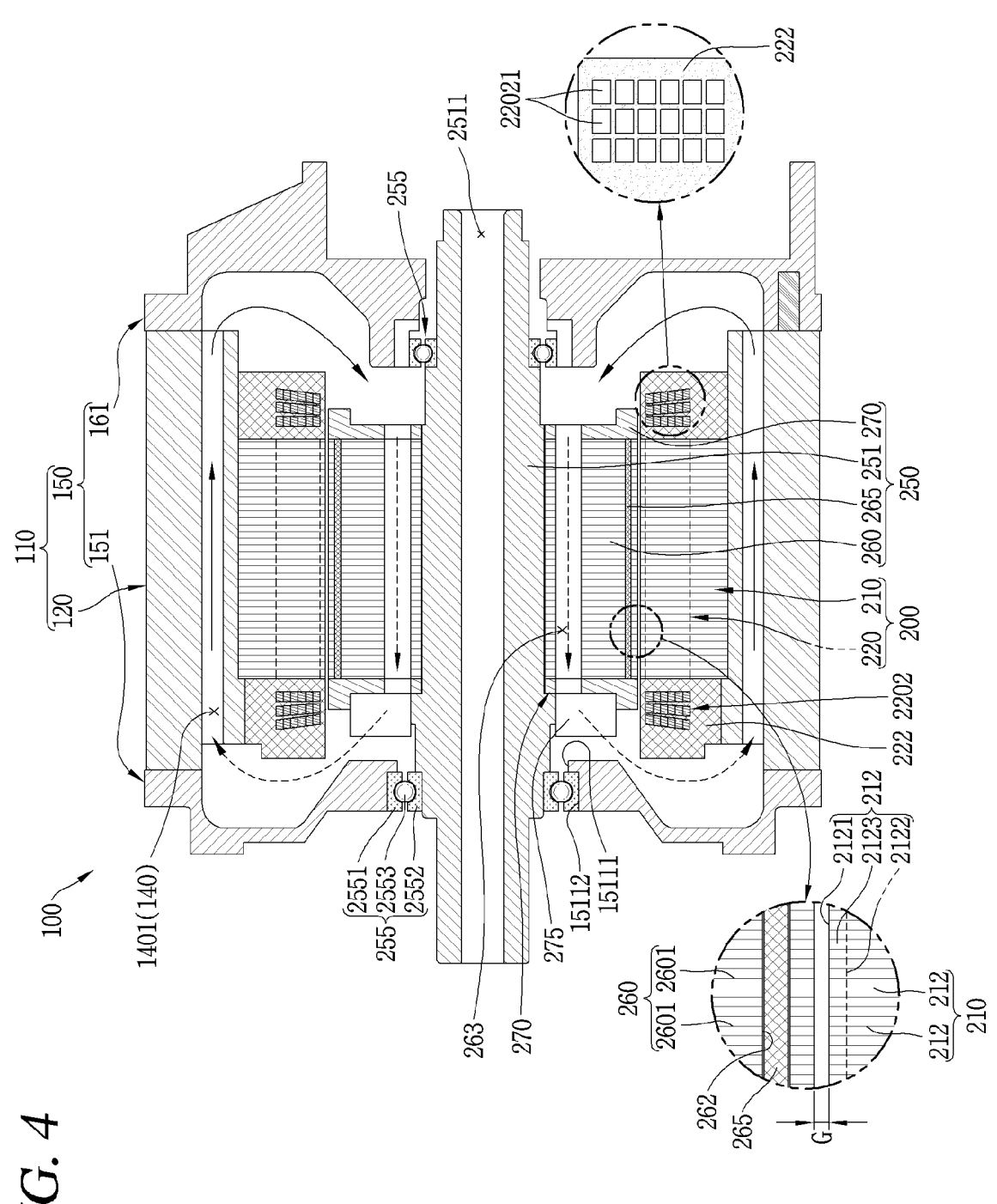
FIG. 4 is a cross-sectional view taken along the line IV-IV of the motor assembly of FIG. 3.
Figure 5:
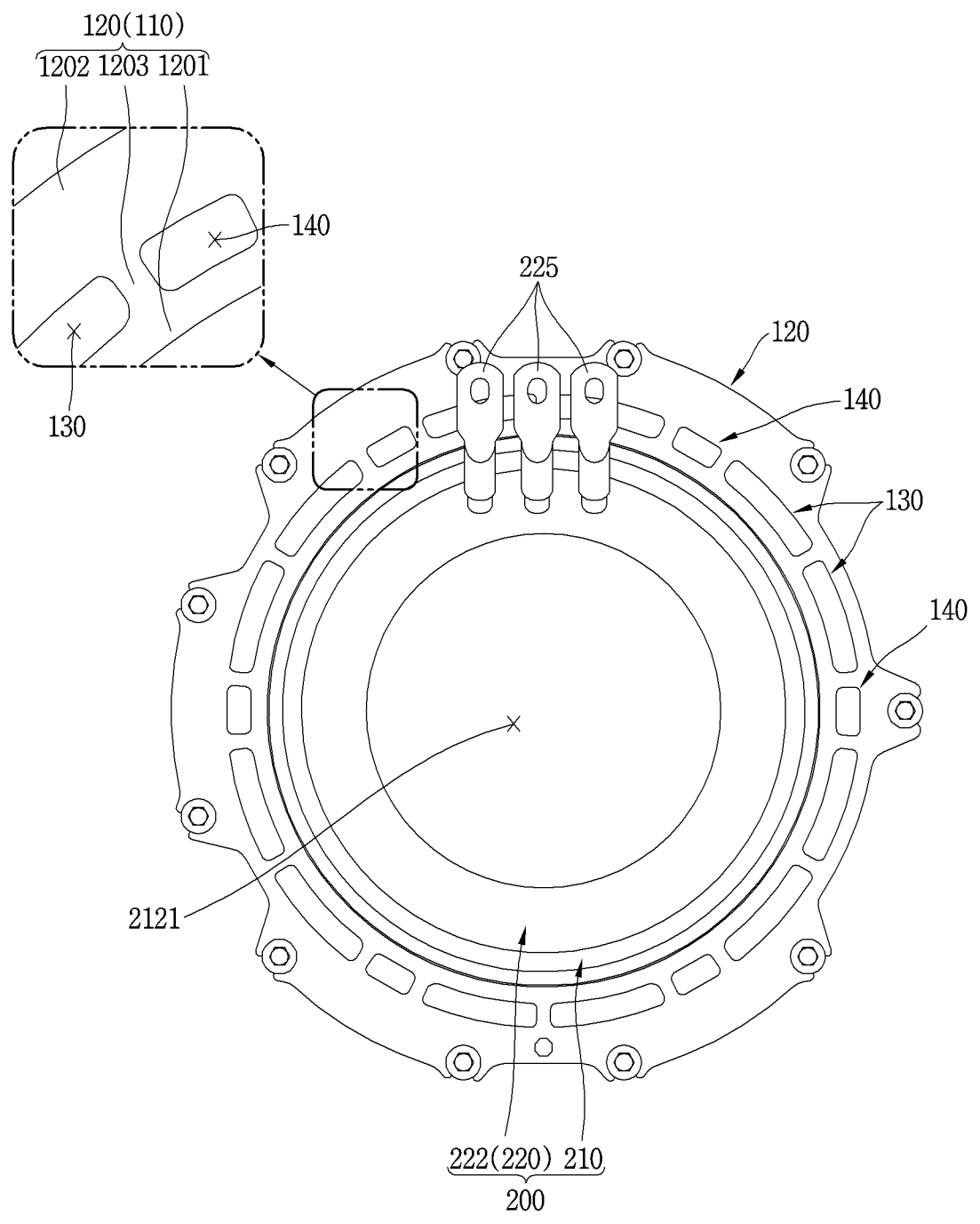
FIG. 5 is a view of a molded part of FIG. 4.

FIG. 3 is a cross-sectional view of the motor assembly of FIG. 1, FIG. 4 is a cross-sectional view taken along the line IV-IV of the motor assembly of FIG. 3, and FIG. 5 is a view of a molded part of FIG. 4. As illustrated in FIGS. 3 and 4, the stator 200 is accommodated in the housing 110, and the rotor 250 is rotatably accommodated inside the stator 200.

The stator 200 includes a stator core 210 coupled to the inside of the housing 110 and a stator coil 220 wound around the stator core 210.

The stator core 210 is implemented in a cylindrical shape.

The rotor accommodating hole 2121 is formed through the stator core 210. The plurality of teeth 2123 and slots 2122 are alternately disposed on the circumference of the rotor accommodating hole 2121 in the circumferential direction.

In an embodiment, the plurality of teeth 2123 and slots 2122 each may be 48 in number.

The stator core 210 is formed by stacking, in an insulating manner, a plurality of electrical steel sheets 212 each having the rotor accommodating hole 2121 and the plurality of teeth 2123 and slots 2122.

The stator coil 220 may be configured by, for example, connecting conductor segments 2201, so-called "hairpins," which are inserted into the plurality of slots 2122, in a preset pattern. Specifically, each of the conductor segments 2201 typically includes two insertion portions inserted into different slots 2122, a connection portion (crown portion) connecting respective ends of the two insertion portions, and extension portions (welded portions) extending from the other respective ends of the two insertion portions toward an outside of the slots 2122 to be welded.

The stator coil 220 includes coil ends 2202 protruding respectively from both ends of the stator core 210 along the axial direction.

The stator coil 220 includes molded parts 222 formed by molding the coil ends 2202.

The molded parts 222 may be formed of a thermal conductive member.

The thermal conductive member may be made of, for example, a material having electrical insulation and excellent thermal conductivity.

The molded parts 222, for example, may be filled between wires (conductors) 22021 of the stator coil 220 to prevent air from existing around the wires 22021.

As illustrated in FIG. 4, the molded part 222 is implemented to surround a circumferential surface (radially inner and outer surfaces and axially outer end surface) of each coil end 2202 of the stator coil 220.

This can prevent an excessive increase in temperature of the coil end 2202 due to an insulation of air existing around the coil end 2202 of the stator coil 220.

The thermally conductive molded part 222 surrounds the coil end 2202 to prevent a direct contact between the surface of the coil end 2202 and air, thereby suppressing the excessive increase in the temperature of the coil end 2202 by rapidly transmitting thermal energy (dissipating heat) generated in the coil end 2202 to the outside.

As illustrated in FIG. 5, the molded part 222 may be formed in a tubular shape that extends in the circumferential direction of the stator 200.

The molded part 222 may extend from the outer surface of the wire 22021 of the coil end 2202 inwardly and outwardly along a radial direction, and may also extend along the axial direction to increase a surface area (heat exchange area), thereby promoting heat dissipation.

The plurality of terminals 225 of the stator coil 220 is disposed on the molded part 222 to be exposed to the outside. The plurality of terminals 225 is connected to the respective phases (U-phase, V-phase, W-phase) of the three-phase AC power source. Accordingly, three-phase AC power can be supplied to the stator coil 220.

Meanwhile, a rotational shaft hole 261 into which the rotational shaft 251 can be inserted is formed through a center of the rotor core 260.

The rotational shaft 251 may be formed of, for example, a hollow member having a through hole 2511 formed therethrough in the axial direction.

The rotor core 260 is provided with a plurality of permanent magnet insertion parts 262 into which the permanent magnets 265 can be inserted in the axial direction.

The plurality of permanent magnet insertion parts 262 is formed through the rotor core 260 in the axial direction.

The rotor 250 is formed such that a plurality of magnetic poles (N pole and S pole) can be alternately formed along the circumferential direction.

In the embodiment of the present disclosure, the plurality of magnetic poles may be, for example, eight poles.

Each of the plurality of magnetic poles may be configured by including the plurality of permanent magnets 265.

The plurality of magnetic poles, for example, may be configured by including three permanent magnets 265, respectively.

In one embodiment, the number of permanent magnets 265 may be 24, however the disclosure is not limited thereto.

The plurality of permanent magnets 265 includes, for example, first permanent magnets 2651 adjacently disposed in a "V" shape with one end of each of the first permanent magnets 2651 adjacent to the circumference of the rotor core 260 and another end positioned inwardly, and second permanent magnets 2652 disposed between the adjacently disposed first permanent magnets 2651 along the circumferential direction of the rotor 250. In one embodiment, the number of first permanent magnets 2651 may be 16 and the number of second permanent magnets may be 8, however the present disclosure is not limited thereto.

The first permanent magnets 2651 and the second permanent magnets 2652 may each have a rectangular cross section shape, for example according to one embodiment.

Meanwhile, the rotor 250 includes a plurality of penetrating parts 263 formed therethrough along the axial direction. Each of the plurality of penetrating parts 263 is formed in an arcuate shape.

The plurality of penetrating parts 263 may be, for example, located around the rotational shaft hole 261.

The plurality of penetrating parts 263 may be located inward from the permanent magnet insertion parts 262.

The plurality of penetrating parts 263 may be respectively formed between the rotational shaft hole 261 and the plurality of permanent magnet insertion parts 262 along the circumferential direction of the rotor core 260.

The plurality of penetrating parts 263 may be disposed along a same circumferential position.

In one embodiment, the number of the plurality of penetrating parts 263 may be eight, for example, however, the present disclosure is not limited thereto.

The housing body 120 has a cylindrical shape.

A plurality of fastening member accommodating portions 1202, in which a plurality of fastening members 125 for fastening the front cover 151 and the rear cover 161 to the housing body 120 are respectively accommodated, is disposed at the outer surface of the housing body 120.

The air flow passage 140 may be defined in the housing 110.

More specifically, the air flow passage 140 may be defined to pass through the housing body 120 in the axial direction.

The air flow passage 140 may include an axial section 1401 formed through the housing body 120 in the axial direction.

The axial section 1401 of the air flow passage 140 may be provided in plurality spaced apart along the circumferential direction of the housing body 120.

In one embodiment, the number of axial sections 1401 of the air flow passage 140 may be six, for example, however the present disclosure is not limited thereto.

The cooling water passage 130 may be defined in the housing 110.

Accordingly, the housing 110 can be cooled by the cooling water that moves along the cooling water passage 130.

In the embodiment of the present disclosure, the cooling water passage 130 may have an axial section 131 passing through the housing body 120 in the axial direction.

The cooling water passage 130 and the air flow passage 140 may be disposed on the same circumference position of the housing body 120.

The cooling water passages 130 and the air flow passages 140 may be alternately formed along the circumferential direction of the housing 110 (housing body 120), for example.

In this embodiment, the housing 110 may be manufactured by extrusion (extrusion processing).

This can facilitate the manufacture of the housing 110 (housing body 120).

In addition, a manufacturing cost of the housing 110 (housing body 120) can be reduced.

The housing body 120 may include an inner wall 1201 defining an accommodation space 1204, an outer wall 1202, and a plurality of barrier ribs 1203 between the inner wall 1201 and the outer wall 1202.

Figure 6:
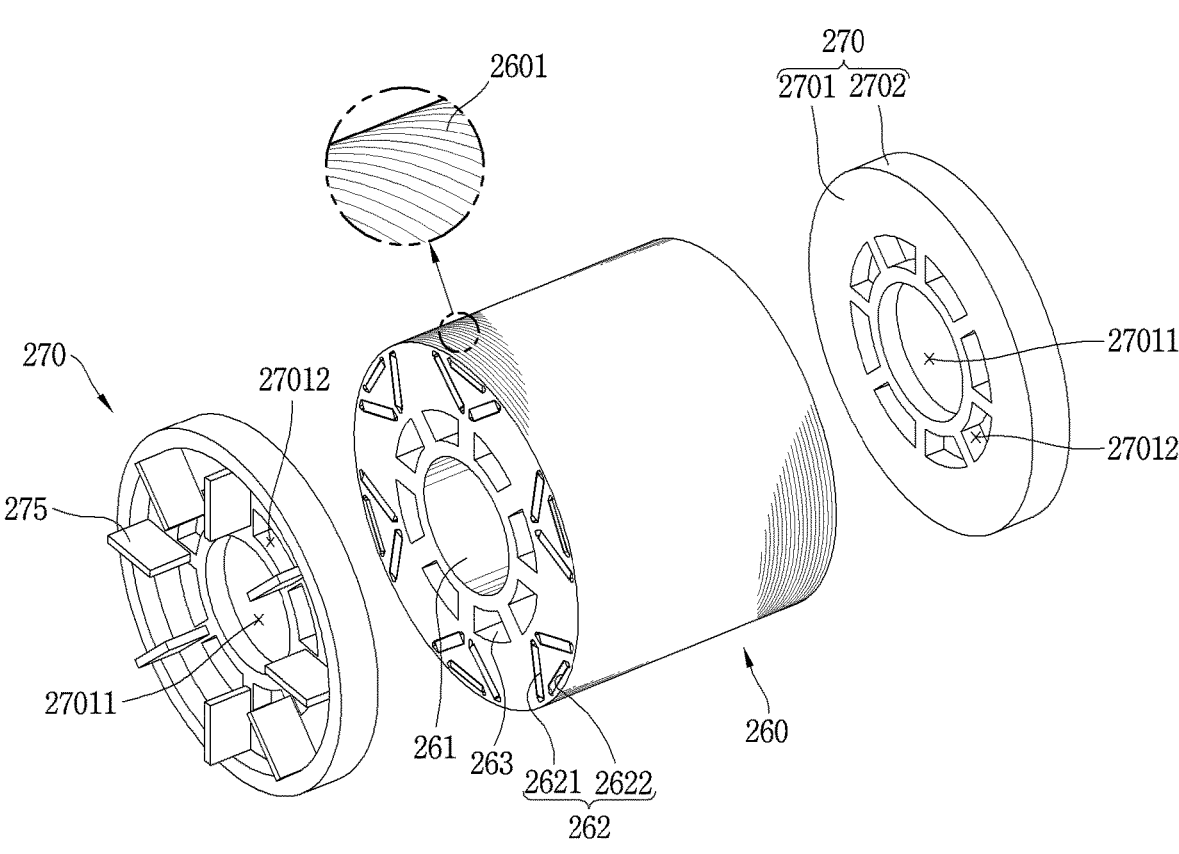
FIG. 6 is an exploded perspective view of an end ring and a rotor core of a rotor of FIG. 4.
Figure 7:
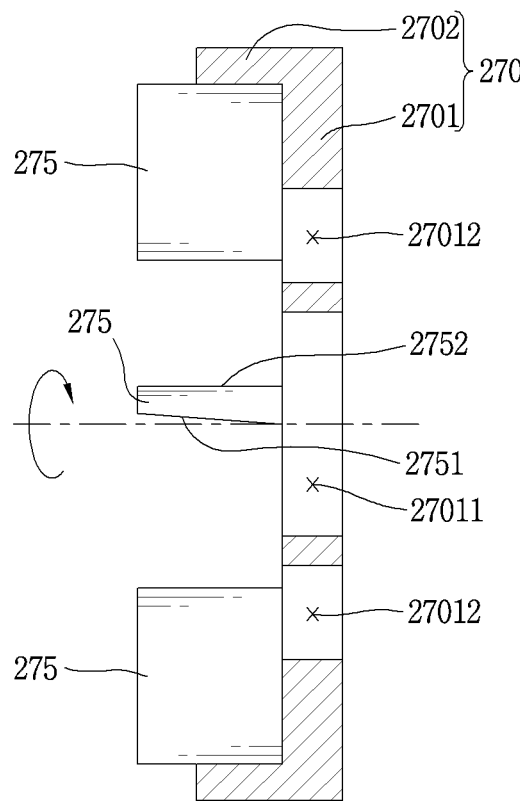
FIG. 7 is a cross-sectional view of the end ring of FIG. 6.
Figure 8:
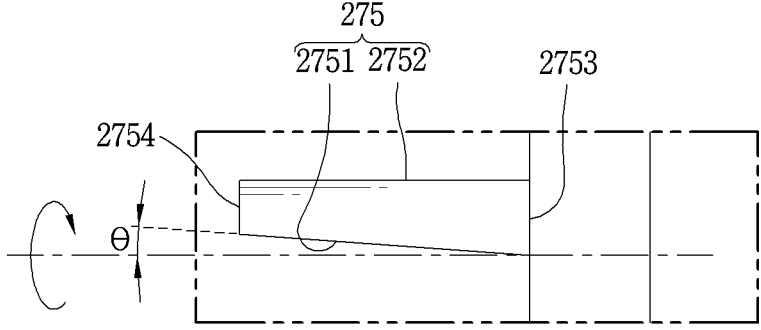
FIG. 8 is an enlarged view of blades of FIG. 7.

FIG. 6 is an exploded perspective view of an end ring and a rotor core of a rotor of FIG. 4, FIG. 7 is a cross-sectional view of the end ring of FIG. 6, and FIG. 8 is an enlarged view of blades of FIG. 7. As illustrated in FIG. 6, the rotor core 260 has a cylindrical shape surrounding the rotational shaft hole 261, the plurality of penetrating parts 263, and the plurality of permanent magnet insertion parts 262.

The rotor 250 includes end rings 270 respectively coupled to both ends of the rotor core 260 in the axial direction.

Each of the end rings 270 is implemented in a disk shape, for example.

Each of the end rings 270 is configured to cover the plurality of permanent magnet insertion parts 262 when coupled to the rotor core 260.

This can prevent the permanent magnets 265 inserted into the permanent magnet insertion parts 262 from being separated in the axial direction.

As illustrated in FIG. 7, for example, the end ring 270 includes a disk part 2701 having a disk shape, and a cylindrical part 2702 extending from an outer edge of the disk part 2701 along the circumferential direction.

A rotational shaft accommodating hole 27011 is formed through the center of each end ring 270 (disk part 2701) so that the rotational shaft 251 can be accommodated therethrough.

Each of the end rings 270 includes a plurality of communication portions 27012 communicating with the plurality of penetrating parts 263 when coupled to the rotor core 260.

The plurality of communication portions 27012 is formed around the circumference of the rotational shaft accommodating hole 27011 of the disk part 2701.

The plurality of communication portions 27012 may communicate with, for example, the plurality of penetrating parts 263, respectively.

As a result, air from the sides of the rotor 250 can freely move to the other side of the rotor 250 through the plurality of penetrating parts 263 and communication portions 27012.

Meanwhile, one of the end rings 270 may be provided with one or more blades 275 that promote air movement during rotation of the rotor.

The blade 275 may be provided in plurality spaced apart from one another along a circumferential direction of the end ring 270.

In the embodiment shown in FIG. 6, the blades 275 are disposed on the left (front) end ring 270 in the drawing, but the present disclosure is not limited thereto.

In this embodiment, the blades 275 are disposed on the end ring 270 located on the front cover 151.

In one embodiment, each of the plurality of blades 275 may be implemented in a substantially rectangular plate shape.

The plurality of blades 275 may be disposed in a radial direction of the end ring 270.

One side surface of each of the plurality of blades 275 may be connected to the disk part 2701 and another side surface (outer end portion) may be connected to an inner surface of the cylindrical part 2702.

Each of the plurality of blades 275 may protrude from the cylindrical portion 2702 in the axial direction.

The plurality of blades 275 may be respectively disposed, for example, at one side of the plurality of communication portions 27012.

In this embodiment, the plurality of blades 275 may be disposed between the plurality of communication portions 27012, respectively.

The embodiment exemplarily illustrates the case in which the number of blades 275 is eight to correspond to the number of communication portions 27012, but the present disclosure is not limited thereto.

Meanwhile, as illustrated in FIG. 8, each of the plurality of blades 275 may include a pressing surface 2751 that is inclined in the axial direction. Accordingly, when each of the plurality of blades 275 is rotated, air may be moved along the pressing surfaces 2751. Each of the plurality of blades 275 includes a rear surface 2752 disposed parallel to the axial direction on an opposite side of the pressing surface 2751.

The pressing surface 2751 may be disposed at a front portion of both planar surfaces of the blade 275 based on a rotational direction (circumferential direction) of the rotor 250.

In addition, the pressing surface 2751 is configured such that an end portion thereof close to the stator core 210 is disposed forward in the rotational direction when the rotor 250 rotates, compared to another end portion positioned further from the stator core 210.

Accordingly, when the rotor 250 rotates, air can be forced by the pressing surface 2751 to move to one side (front side) in the axial direction.

According to this configuration, since the end portion of the pressing surface 2751 close to the stator core is disposed more forward with respect to the rotational direction of the rotor 250 than the another end portion further from the stator core 210, air moves in a direction from the stator core 210 toward the outside of the rotor core 260 (i.e., toward the front side or the front cover 151) in the axial direction.

Figure 9:
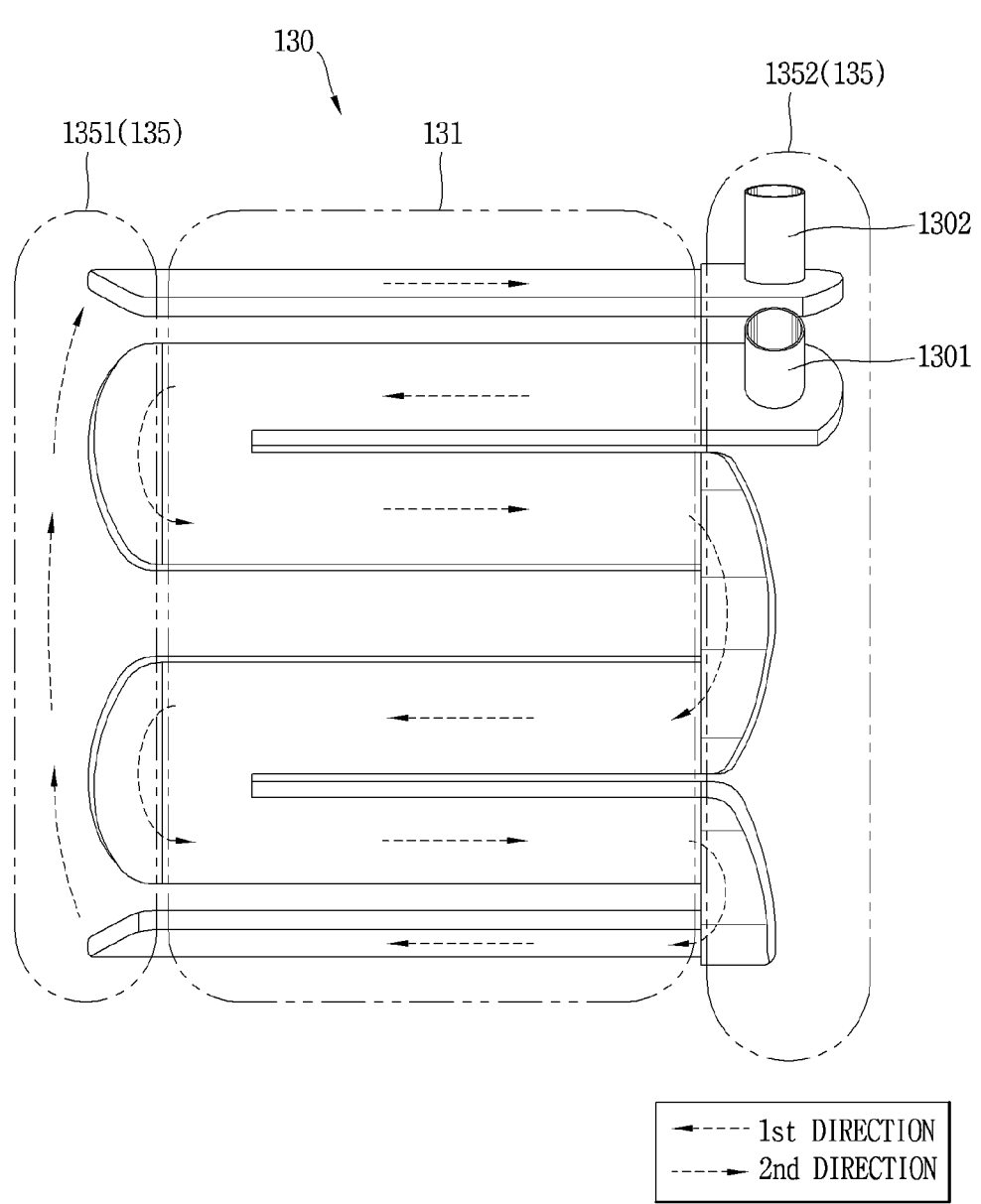
FIG. 9 is a view of a cooling water passage of FIG. 4.
Figure 10:
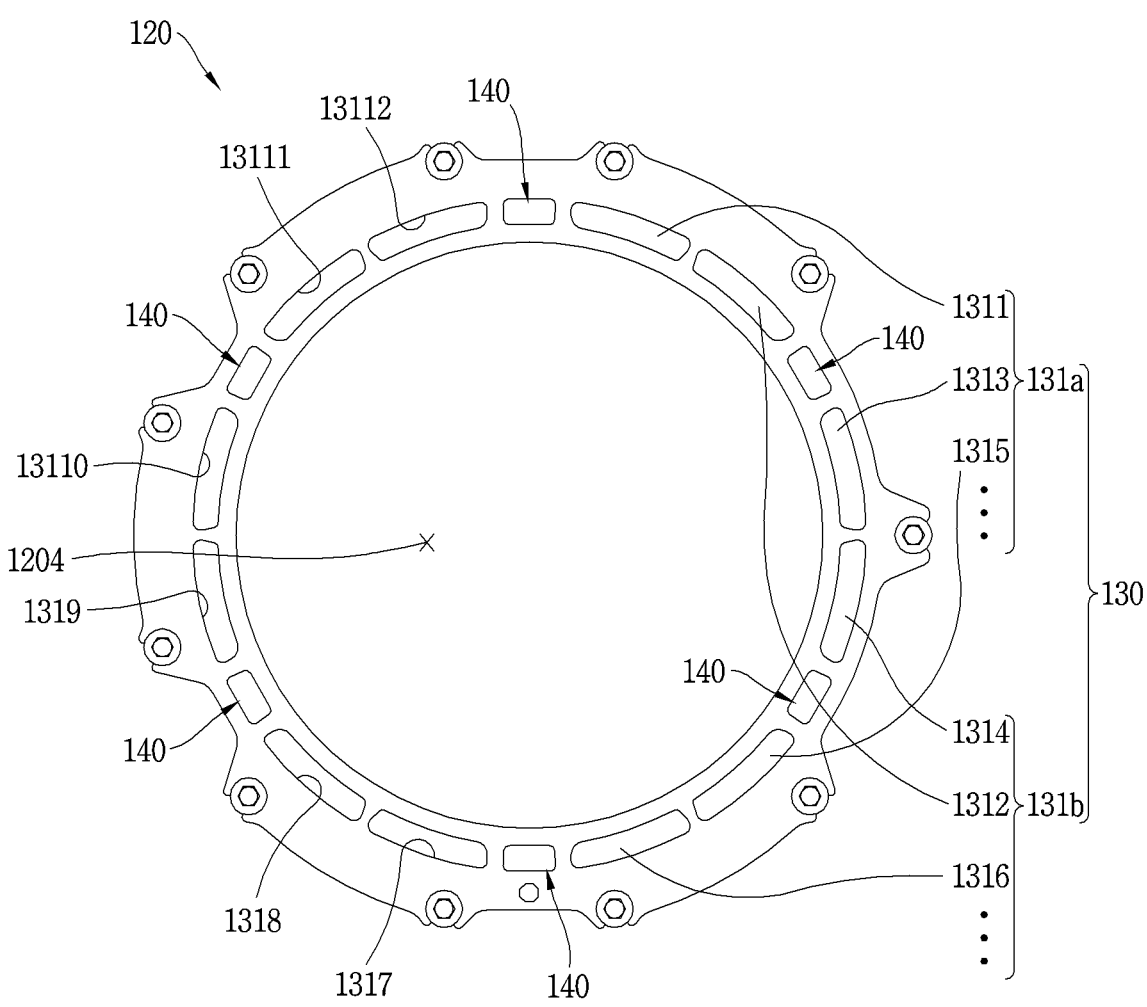
FIG. 10 is a cross-sectional view of a housing of FIG. 3.

FIG. 9 is a view of a cooling water passage of FIG. 4, and FIG. 10 is a cross-sectional view of a housing of FIG. 3. As illustrated in FIGS. 9 and 10, the cooling water passage 130 includes a plurality of axial sections 131 disposed along the axial direction, and a plurality of return parts 1351, 1352 disposed in the circumferential direction and each connecting (communicating) two adjacent axial sections 131 in the circumferential direction.

In one embodiment of the present disclosure, the plurality of axial sections 131 may be connected in series.

In an embodiment of the present disclosure, all of the plurality of axial sections 131 are connected in series, but this is merely illustrative, and the present disclosure is not limited thereto. Some of the plurality of axial sections 131 may be connected in series and others may be connected in parallel.

The plurality of axial sections 131 may be formed in the housing body 120.

The plurality of return parts 1351, 1352 may be formed in, for example, the front cover 151 and the rear cover 161, respectively.

As illustrated in FIG. 10, according to one embodiment, the plurality of axial sections 131 includes a first axial section 1311, a second axial section 1312, a third axial section 1313, a fourth axial section 1314, a fifth axial section 1315, a sixth axial section 1316, a seventh axial section 1317, an eighth axial section 1318, a ninth axial section 1319, a tenth axial section 13110, an eleventh axial section 13111, and a twelfth axial section 13112 that are spaced apart from one another along the circumferential direction of the housing body 120.

In an embodiment of the present disclosure, two of the plurality of axial sections 131 may be implemented as a pair and thus a total of six pairs of axial sections 131 may be provided.

The respective pairs of axial sections 131 are spaced a preset distance apart from one another along the circumferential direction.

The air flow passages 140 are respectively disposed between neighboring pairs of axial sections 131.

Each pair of axial sections 131 includes a first section 131a in which cooling water moves in a first direction and a second section 131b in which the cooling water moves in a second direction. The barrier rib 1203 is interposed between the first section 131a and the second section 131b.

In an embodiment of the present disclosure, among the first axial section 1311 to the twelfth axial section 13112, the odd-numbered axial sections 131 including the first axial section 1311 may be referred to as the first sections 131a, and the even-numbered axial sections 131 including the second axial section 1312 may be referred to as the second sections 131b.

As illustrated in FIG. 9, the plurality of return parts 135 includes a first return part 1351 connecting the first section 131a and the second section 131b, and a second return part 1352 connecting the second section 131b and another first section 131a.

In an embodiment of the present disclosure, the first return part 1351 may be formed in the front cover 151.

The second return part 1352 may be formed in the rear cover 161.

More specifically, as illustrated in FIG. 9, a cooling water inlet 1301 through which cooling water can flow in may be disposed at one side (right side in the drawing) of the first section 131a (first axial section 1311). The cooling water inlet 1301 may be formed in, for example, the rear cover 161.

A cooling water outlet 1302 through which cooling water can flow out may be disposed at one side (right side in the drawing) of the second section 131b (the twelfth axial section 13112). The cooling water outlet 1302 may be formed in, for example, the rear cover 161.

Figure 11:
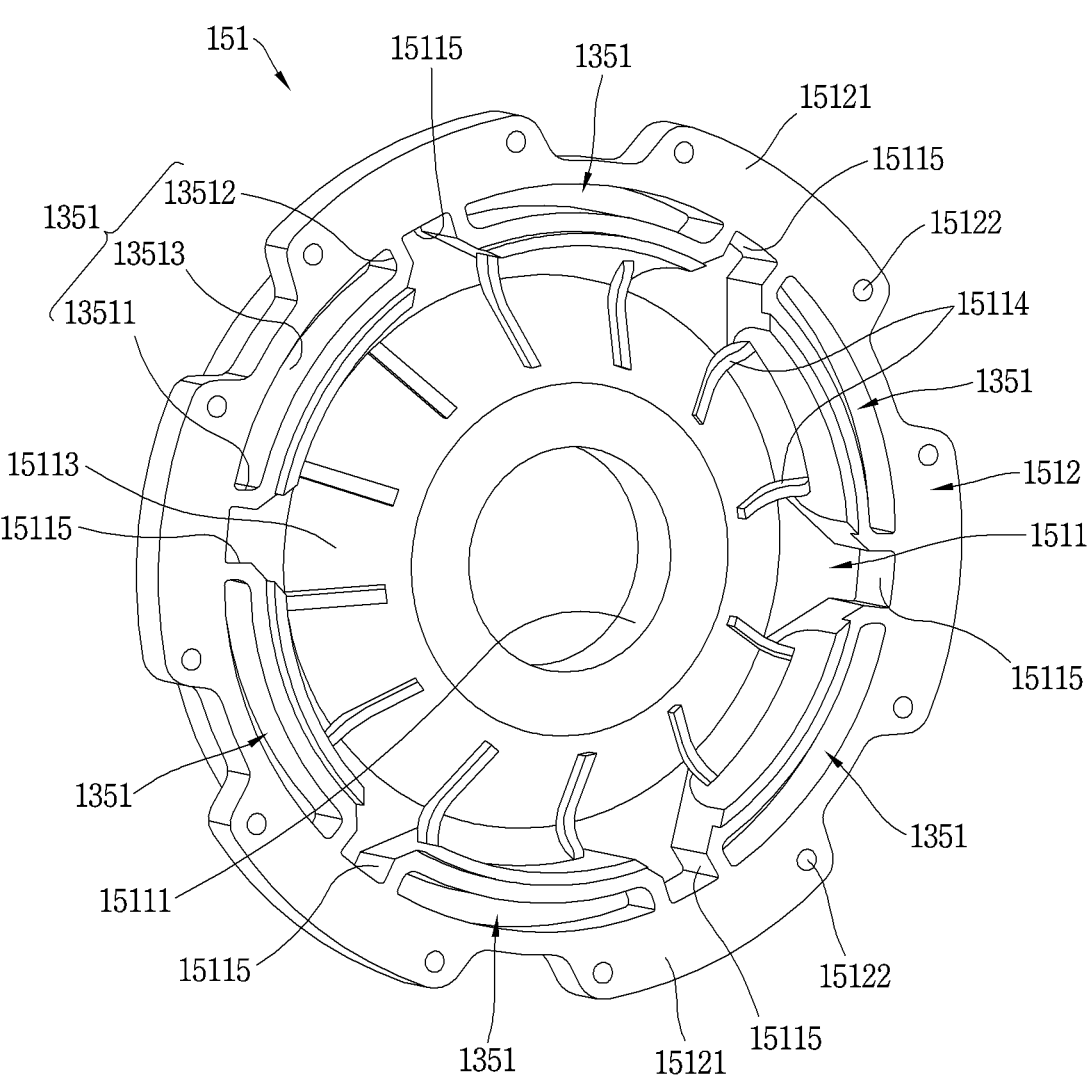
FIG. 11 is a view illustrating an inner surface of a front cover of FIG. 4.

FIG. 11 is a view illustrating an inner surface of a front cover of FIG. 4. As illustrated in FIG. 11, the front cover 151 includes a disk part 1511 having a disk shape, and an end portion contact part 1512 disposed at an outer edge portion of the disk part 1511 and brought into contact with an end portion of the housing body 120.

A rotational shaft hole 15111 is formed through the front cover 151 so that the rotational shaft 251 can be accommodated therethrough.

A bearing accommodating portion 15112 is disposed at one side of the rotational shaft hole 15111 to accommodate the bearing 255 (see FIG. 4).

The end portion contact part 1512 is provided with a plurality of fastening member coupling portions 15121 to which the fastening members 125 coupled to the housing body 120 can be coupled. The plurality of fastening member coupling portions 15121, for example, may protrude outward from the end portion contact parts 1512 in the radial direction and may be spaced apart from one another in the circumferential direction. Fastening member insertion holes 15122 are formed through the plurality of fastening member coupling portions 15121, respectively, so that the fastening members 125 can be accommodated therein.

The disc part 1511 includes a guide slope 15113 inclined from an edge of the rotational shaft hole 15111 toward the rotational shaft hole 15111.

The end portion contact part 1512 protrudes along the axial direction from an outer edge portion of the disk part 1511.

Accordingly, air which has moved axially outward by the plurality of blades 275 of the end ring 270 during the rotation of the rotor 250 can easily change a flowing direction while moving along the guide slope 15113 and the inner surface of the end portion contact part 1512. This can allow smooth air circulation inside the housing 110.

The front cover 151 is provided with a plurality of guide portions 15114 protruding from an inner surface thereof and extending in the radial direction.

As a result, air which has moved in the axial direction by the plurality of blades 275 of the end ring 270 can be appropriately distributed by the plurality of guide portions 15114 in the circumferential direction and move outward in the radial direction.

Meanwhile, the front cover 151 includes the plurality of first return parts 1351.

The plurality of first return parts 1351 are formed in the end portion contact part 1512.

In an embodiment of the present disclosure, the plurality of first return parts 1351 is recessed from the inner surface of the end portion contact part 1512 in the axial direction.

Each of the plurality of first return parts 1351 is formed in an arcuate shape.

The plurality of first return parts 1351 is disposed to communicate with the first sections 131a and the second sections 131b with the barrier ribs 1203 interposed therebetween.

The first return part 1351 includes a first section communicating portion 13511 communicating with the first section 131a, a second section communicating portion 13512 communicating with the second section 131b, and a connecting portion 13513 through which the first section communicating portion 13511 and the second section communicating portion 13512 communicate with each other.

The front cover 151 is provided with air inlets 15115 through which air is introduced into the air flow passage 140 of the housing body 120.

The air inlets 15115 communicate with the air flow passage 140.

The air inlets 15115 are disposed between adjacent first return parts 1351.

The air inlets 15115 are formed in a shape with a substantially rectangular cross-section.

Each of the air inlets 15115 is formed such that an inner side (a side toward the housing body 120) is open in the axial direction.

The air inlets 15115 are formed to be open inward (toward the rotational shaft hole) in the radial direction.

Figure 12:
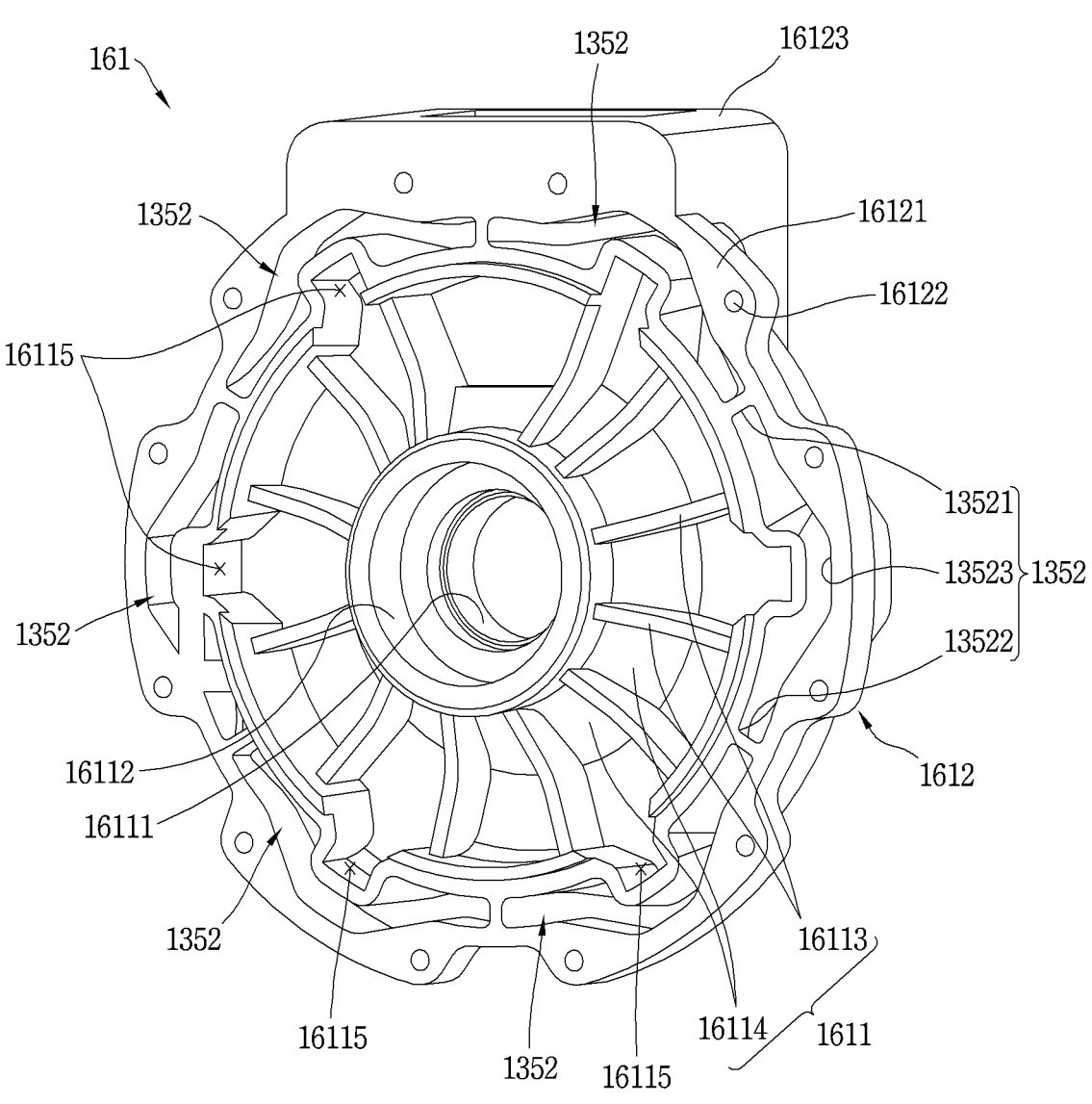
FIG. 12 is a view illustrating an inner surface of a rear cover of FIG. 4.

FIG. 12 is a view illustrating an inner surface of a rear cover of FIG. 4. As illustrated in FIG. 12, the rear cover 161 includes a disk part 1611 having a disk shape, and an end portion contact part 1612 disposed on an outer end portion of the disk part 1611 and brought into contact with an end portion of the housing body 120.

A rotation shaft hole 16111 is formed through the rear cover 161 so that the rotational shaft 251 can be accommodated therethrough. The rotational shaft hole 16111 is formed through a center of the disk part 1611 in the axial direction.

The disk part 1611 of the rear cover 161 is provided with a bearing accommodating portion 16112 in which the bearing 255 supporting the rotational shaft 251 can be accommodated. The bearing accommodating portion 16112 of the rear cover 161 is disposed in an inner surface of the rear cover 161.

The end portion contact part 1612 of the rear cover 161 is provided with a plurality of fastening member coupling portions 16121 to which the fastening members 125 coupled to the housing body 120 can be coupled. Fastening member insertion holes 16122 are formed through the plurality of fastening member coupling portions 16121, respectively, so that the fastening members 125 can be inserted therein.

The rear cover 161 is provided with a terminal block 16123 to which terminals 225 connected to the stator coil 220 are coupled. The terminal block 16123 is implemented to protrude outward from the end portion contact part 1612 in the radial direction. The terminal block 16123 protrudes upward from the end portion contact part 1612. An accommodation space in which the terminals 225 are accommodated is defined inside the terminal block 16123.

The rear cover 161 is provided with a plurality of guide portions 16113 for guiding air inside the housing 110 to move in the radial direction. The guide portions 16113 of the rear cover 161 protrude from the inner surface of the rear cover 161 and extend in the radial direction.

The disk part 1611 of the rear cover 161 is provided with a guide slope 16114 angled downward from the bearing accommodating portion 16112.

Accordingly, air that has moved in the radial direction after being discharged from the housing body 120 can be guided to the penetrating parts 263 of the rotor 250.

Meanwhile, the rear cover 161 includes the plurality of second return parts 1352.

The plurality of second return parts 1352 are formed in the end portion contact part 1612.

The plurality of second return parts 1352 are recessed from the end portion contact part 1612 in the axial direction.

A second return part 1352 communicates with a second section 131b and the first section 131a that are spaced apart from each other with the air flow passage 140 interposed therebetween.

Accordingly, cooling water that has moved through the second section 131b can flow into the first section 131a on one side.

The second return part 1352 includes a second section communicating portion 13521 communicating with the second section 131b, a first section communicating portion 13522 communicating with the first section 131a, and a connecting portion 13523 through which the second section communicating portion 13521 and the first section communicating portion 13522 communicate with each other.

In an embodiment of the present disclosure, the connecting portion 13523 of the second return part 1352 has a cross-sectional shape that is outwardly convex to accommodate the air flow passage 140 (air outlet 16115).

An air outlet 16115 communicating with the air flow passage 140 of the housing body 120 is formed at an inner side of the connecting portion 13523 of the second return part 1352 in the radial direction. The air outlet 16115 has a substantially rectangular cross-sectional shape.

More specifically, the air outlet 16115 is formed to be open toward the housing body 120 in the axial direction.

The air outlet 16115 is formed to open inward in the radial direction.

According to this configuration, air that has passed through each air flow passage 140 of the housing body 120 is discharged to the corresponding air outlet 16115. The air then moves from the air outlet 16115 toward a central area in the radial direction. The air moved to the central area moves toward the penetrating part 263 of the rotor 250 by the guide slope 16114 and the guide portion 16113 thus to move axially along the communicating portion 27012 of the end ring 270 and the penetrating part 260 of the rotor core 260. Accordingly, the air can cool the rotor 250 and the inner surface of the stator core 210.

Figure 13:
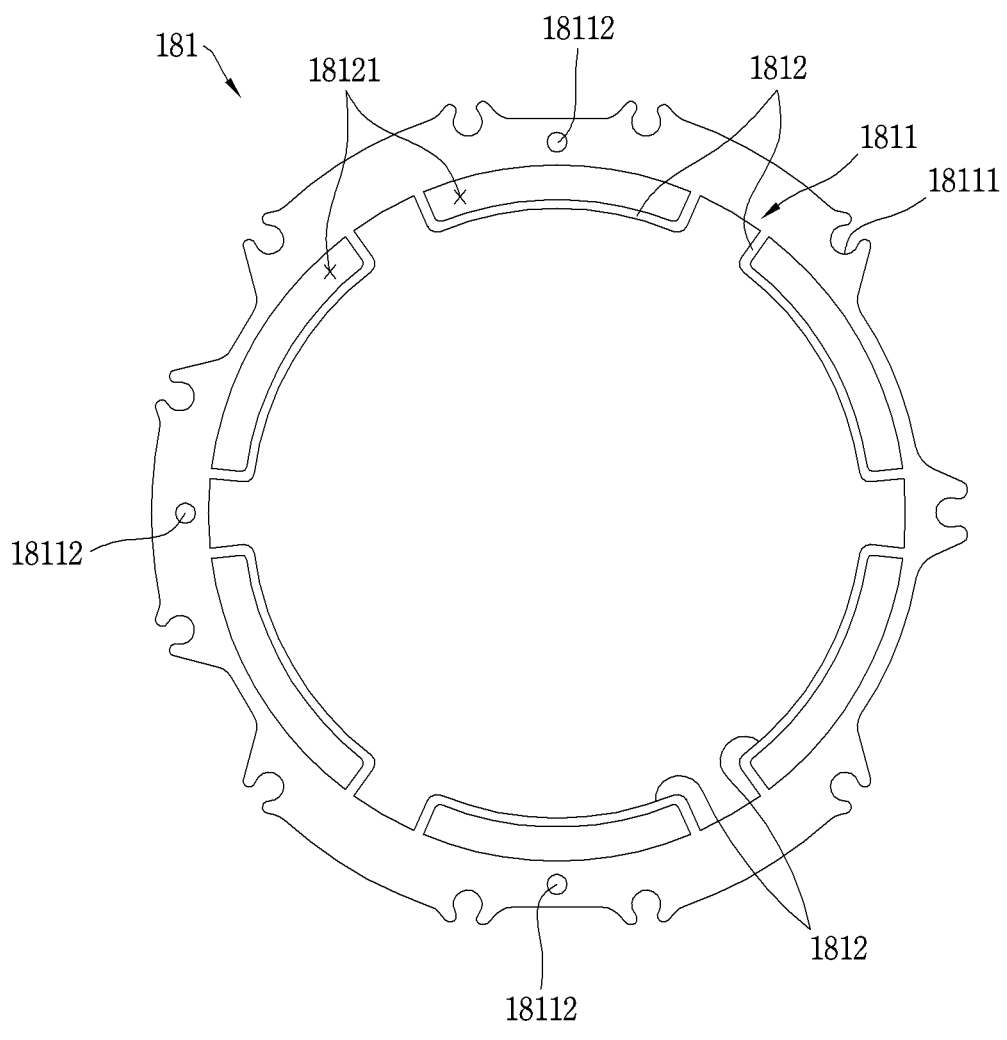
FIG. 13 is a front view of a front gasket of FIG. 2.
Figure 14:
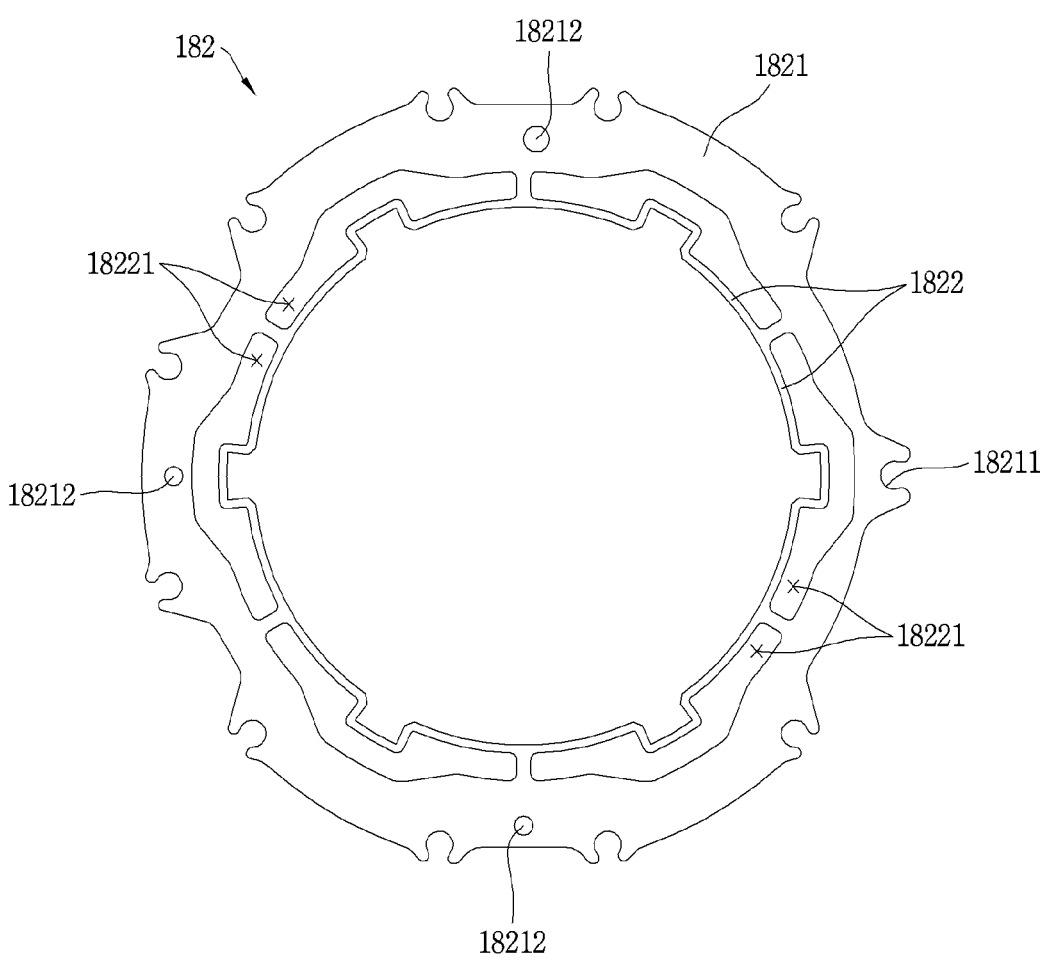
FIG. 14 is a front view of a rear gasket of FIG. 2.

FIG. 13 is a front view of a front gasket of FIG. 2, and FIG. 14 is a front view of a rear gasket of FIG. 2. As illustrated in FIGS. 2, 13, and 14, the gaskets 181, 182 are coupled between the housing body 120 and the covers (front cover 151 and rear cover 161), respectively.

Accordingly, leakage of the cooling water through a gap between the housing body 120 and the front cover 151 and a gap between the housing body 120 and the rear cover 161 can be prevented.

Each of the gaskets 180 includes, for example, a front gasket 181 coupled to a contact area between the housing body 120 and the front cover 151, and a rear gasket 182 coupled to a contact area between the housing body 120 and the rear cover 161.

As illustrated in FIG. 13, the front gasket 181 includes, for example, a gasket body 1811 having a ring shape, and a cooling water passage blocking part 1812 formed on the gasket body 1811 to block leakage of cooling water.

The gasket body 1811 may be implemented as a water-proof member (e.g., a rubber member) to suppress the leakage of the cooling water.

A plurality of fastening member accommodating portions 18111 in which the plurality of fastening members 125 coupled to the housing body 120 can be accommodated is formed through the gasket body 1811.

Guide pin holes 18112 in which guide pins for guiding the gasket 180 to be assembled at an accurate assembly position are formed through the gasket body 1811.

The cooling water passage blocking parts 1812 are disposed at an inner side of the gasket body 1811 of the front gasket 181. The cooling water passage blocking parts 1812 are formed in a substantially arcuate shape. The cooling water passage blocking part 1812 is formed to correspond to the shape of the first return part 1351 of the front cover 151. A first return part communicating portion 18121 communicating with the first return part 1351 is disposed inside the cooling water passage blocking part 1812.

This can suppress leakage of cooling water that moves from the first section 131a of the housing body 120 to the second section 131b via the first return part 1351.

As illustrated in FIG. 14, the rear gasket 182 includes, for example, a gasket body 1821 having a ring shape, and a cooling water passage blocking part 1822 formed on the gasket body 1821 to block leakage of cooling water.

The gasket body 1821 may be implemented as a water-proof member (e.g., a rubber member) to suppress the leakage of the cooling water.

A plurality of fastening member accommodating portions 18211 in which the plurality of fastening members 125 coupled to the housing body 120 can be accommodated is formed through the gasket body 1821.

Guide pin holes 18212 in which guide pins for guiding the gasket 180 to be assembled at an accurate assembly position are formed through the gasket body 1821.

The cooling water passage blocking parts 1822 are disposed at the inner side of the gasket body 1821.

The cooling water passage blocking part 1822 is formed to correspond to the shape of the second return part 1352 of the rear cover 161.

A second return part communicating portion 18221 communicating with the second return part 1352 is disposed inside the cooling water passage blocking part 1822.

This can suppress leakage of cooling water that moves from the second section 131b of the housing body 120 to the first section 131a via the second return part 1352.

With this configuration, when an operation starts, power may be applied to the stator coil 220, and magnetic force (rotating magnetic field) may be generated by the stator coil 220. The magnetic force generated by the stator coil 220 interacts with magnetic force generated by the permanent magnets 265 of the rotor 250 so that the rotor 250 rotates centering on the rotational shaft 251.

When the rotor 250 rotates, the plurality of blades 275 disposed on the end ring 270 of the rotor 250 rotates to move surrounding air outward (toward the front side) along the axial direction. The air pressed by the plurality of blades 275 moves along the inner surface of the front cover 151 and then flows into the air flow passages 140 of the housing body 120.

Meanwhile, when the operation starts, a temperature of the stator coil 220 is increased by electric resistance heat, and a temperature around the stator coil 220 is increased by thermal energy generated by the stator coil 220.

When the operation starts, cooling water may flow into the cooling water passage 130 of the housing 110. Since the cooling water has a relatively low temperature, the temperature of the housing 110 that exchanges heat with the cooling water can be reduced. Therefore, the housing 110 can be maintained at a relatively low temperature.

Air introduced into the air flow passage 140 by the rotation of the rotor 250 can be cooled by exchanging heat with the housing 110 while moving along the air flow passage 140.

The air cooled while flowing through the air flow passage 140 of the housing body 120 may be discharged to an inner rear area of the housing 110 in the axial direction.

As a result, the inner rear area of the housing 110 can be cooled and the temperature can be lowered.

The air discharged to the inner rear area of the housing 110 moves toward the rotational shaft 251 along the inner surface of the rear cover 161, and is mainly suctioned into the penetrating part 263 of the rotor 250. Another part of the air in the inner rear area of the housing 110 is suctioned through an air gap G between the stator 200 and the rotor 250 to cool each of the outer surface of the rotor 250 and the inner surface of the stator 200.

The air introduced into the penetrating part 263 of the rotor 250 exchanges heat with the rotor 250 to cool the rotor 250. As the rotor 250 is cooled, the temperature rise of the rotor core 260 and the permanent magnet 265 can be suppressed.

The air discharged from the penetrating part 263 of the rotor 250 moves radially outward along the inner surface of the front cover 151, and flows into the air flow passage 140 of the housing body 120 through the air inlet 15115 so as to be cooled. The cooled air is then discharged to the inner rear area of the housing body 120. These processes are repeatedly performed such that the stator 200 and the rotor 250 can be cooled.

As described above, in the motor assembly of the disclosed embodiments, the housing 110 includes the cooling water passage 130 through which cooling water is moved and the air flow passage 140 through which air inside the housing 110 is moved and cooled. With the configuration, the air inside the housing 110 can be maintained at a preset temperature or less.

In the motor assembly according to the embodiment of the present disclosure, specifically, for example, it has been measured that the stator coil 220 is 144.1° C., the stator core 210 is 132.9° C., and the rotor core 260 and permanent magnet 265 are 122.5° C., respectively. Compared to the case where only the cooling water passage 130 is defined in the housing 110 (i.e., the housing body 120), a significantly reduced temperature can be maintained.

Accordingly, in the motor assembly 100 according to the embodiments of the present disclosure, the use of high-priced heavy rare earth elements, which are typically added for the permanent magnet 265 of the rotor 250 to maintain high coercive force at a high temperature, can be excluded, or the usage amount of the expensive heavy rare earth elements can be significantly reduced. This can result in remarkably reducing a manufacturing cost of the permanent magnets 265.

Figure 15:
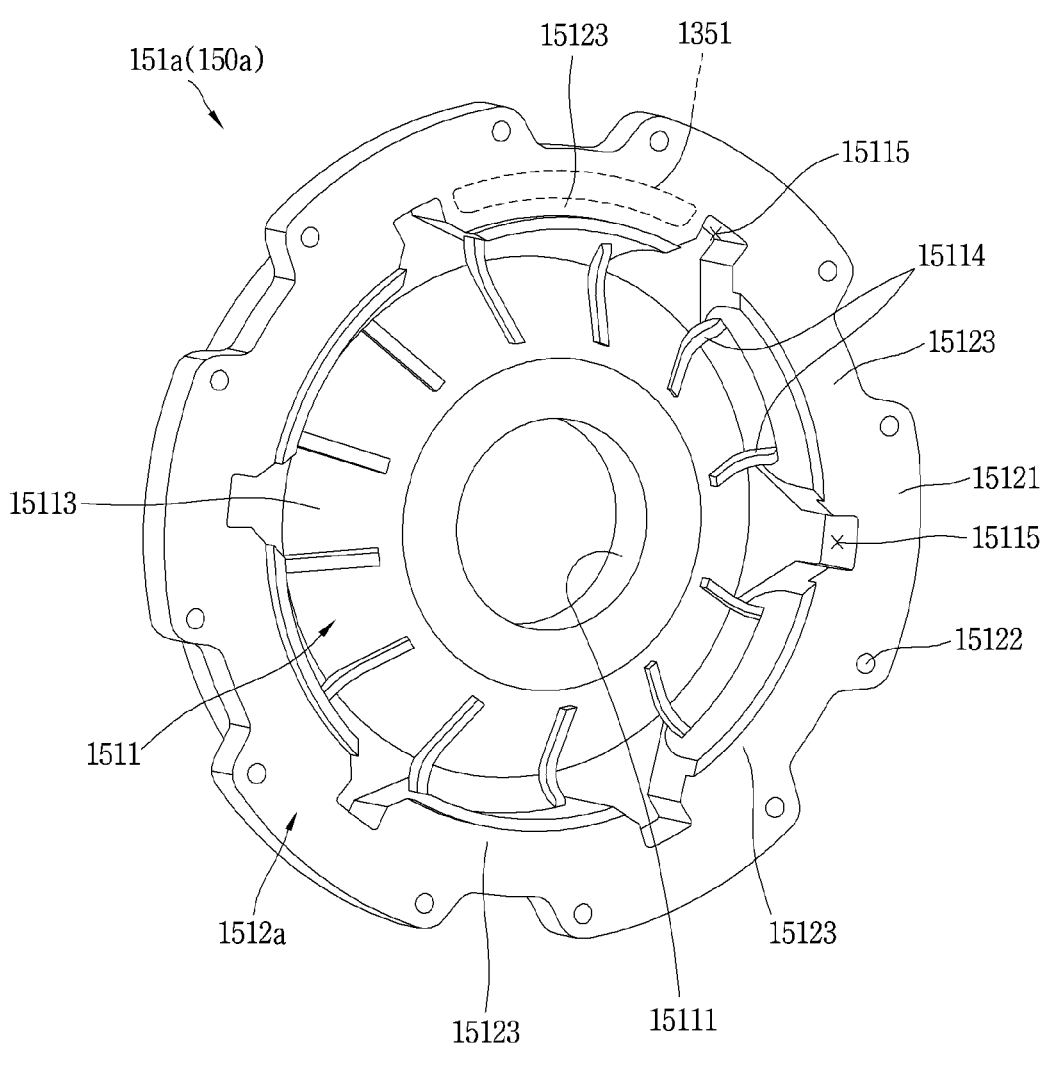
FIG. 15 is a view illustrating a modified example of a front cover of FIG. 11.
Figure 16:
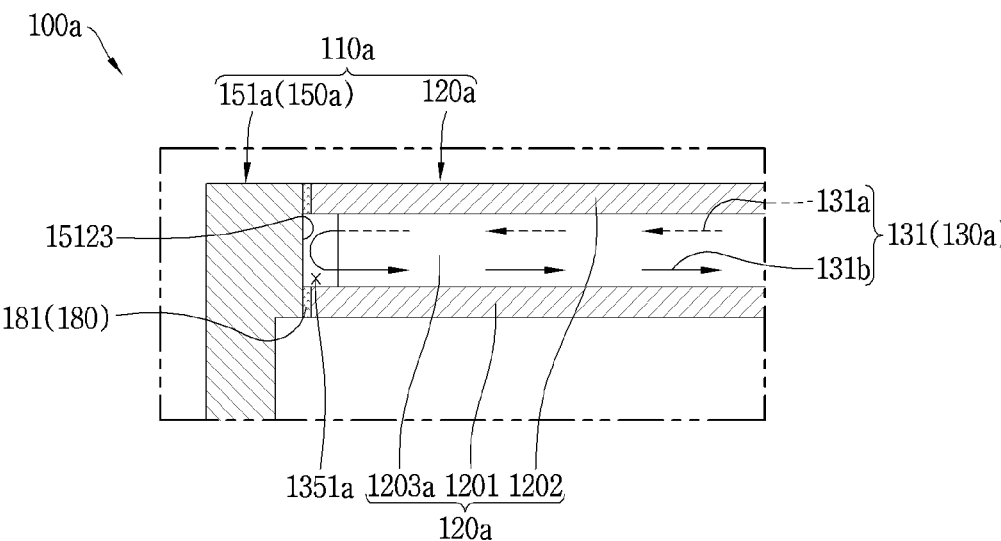
FIG. 16 is a view illustrating a coupled state of the front cover of FIG. 15 and a housing body.

FIG. 15 is a view illustrating a modified example of a front cover of FIG. 11 according to an embodiment, and FIG. 16 is a view illustrating a coupled state of the front cover of FIG. 15 and a housing body according to an embodiment of the present disclosure. As illustrated in FIGS. 15 and 16, a motor assembly 100*a* according to a modified example of the present disclosure includes a housing 110*a*, a stator 200, and a rotor 250.

The housing 110*a* defines an accommodation space 1204 therein, and the stator 200 and the rotor 250 are accommodated in the accommodation space 1204.

The housing 110*a* has therein a cooling water passage 130*a* in which cooling water exchanges heat while flowing therethrough, and an air flow passage 140 in which air inside the accommodation space 1204 exchanges heat while moving through the housing 110. As described above, the air flow passage 140 is disposed between the adjacent cooling water passages 130*a* in a circumferential direction of a housing body 120*a*.

The housing 110*a* includes a housing body 120*a* in a cylindrical shape and covers 151*a* coupled to both ends of the housing body 120*a*.

The covers 151*a* may include, for example, a front cover 151*a* coupled to a front end portion of the housing body 120*a*, and a rear cover 161 coupled to a rear end portion of the housing body 120*a*.

As illustrated in FIG. 16, the housing body 120*a* includes an inner wall 1201 in which the accommodation space 1204 is defined, an outer wall 1202 concentrically disposed outside the inner wall 1201, and a plurality of barrier ribs 1203*a* connecting the inner wall 1201 and the outer wall 1202.

The cooling water passage 130*a* includes a first section 131*a* in which cooling water moves in a first direction and a second section 131*b* in which the cooling water moves in a second direction opposite to the first direction. The first section 131*a* and the second section 131*b* are disposed side by side with the corresponding barrier rib 1203*a* interposed therebetween.

In the embodiment of the present disclosure, the plurality of barrier ribs 1203*a* may be configured to have a reduced length compared to the inner wall 1201 and the outer wall 1202 in the axial direction.

Accordingly, first return parts 1351*a* in each of which cooling water of the first section 131*a* changes a direction to move into the second section 131*b* can be defined inside the housing body 120*a*.

On the other hand, as illustrated in FIG. 15, the front cover 151*a* includes a disk part 1511 having a disk shape, and an end portion contact part 1512*a* disposed on an outer end portion of the disk part 1511 and brought into contact with an end portion of the housing body 120.

In this embodiment of the present disclosure, first return part blocking portions 15123 blocking open areas of the respective first return parts 1351*a* are formed on the end portion contact part 1512*a* of the front cover 151*a*.

The first return part blocking portions 15123 are spaced apart from one another along the circumferential direction.

Each of the first return part blocking portions 15123 may be configured as a flat surface.

A gasket 180 (front gasket 181) is disposed between the front cover 151*a* and the housing body 120*a*.

As described above, the gasket 180 is provided with the cooling water passage blocking part 1812 to block an edge of the first return part 1351, so as to suppress the cooling water of the first return part 1351 from leaking out.

Air inlets 15115 are recessed radially outward between the adjacent first return part blocking portions 15123 continuously disposed in the circumferential direction. The air inlets 15115 communicate with the air flow passages 140 of the housing body 120 such that air can be introduced.

With this configuration, the cooling water flowing into the first section 131*a* moves to the second section 131*b* via the first return part 1351*a*.

Figure 17:
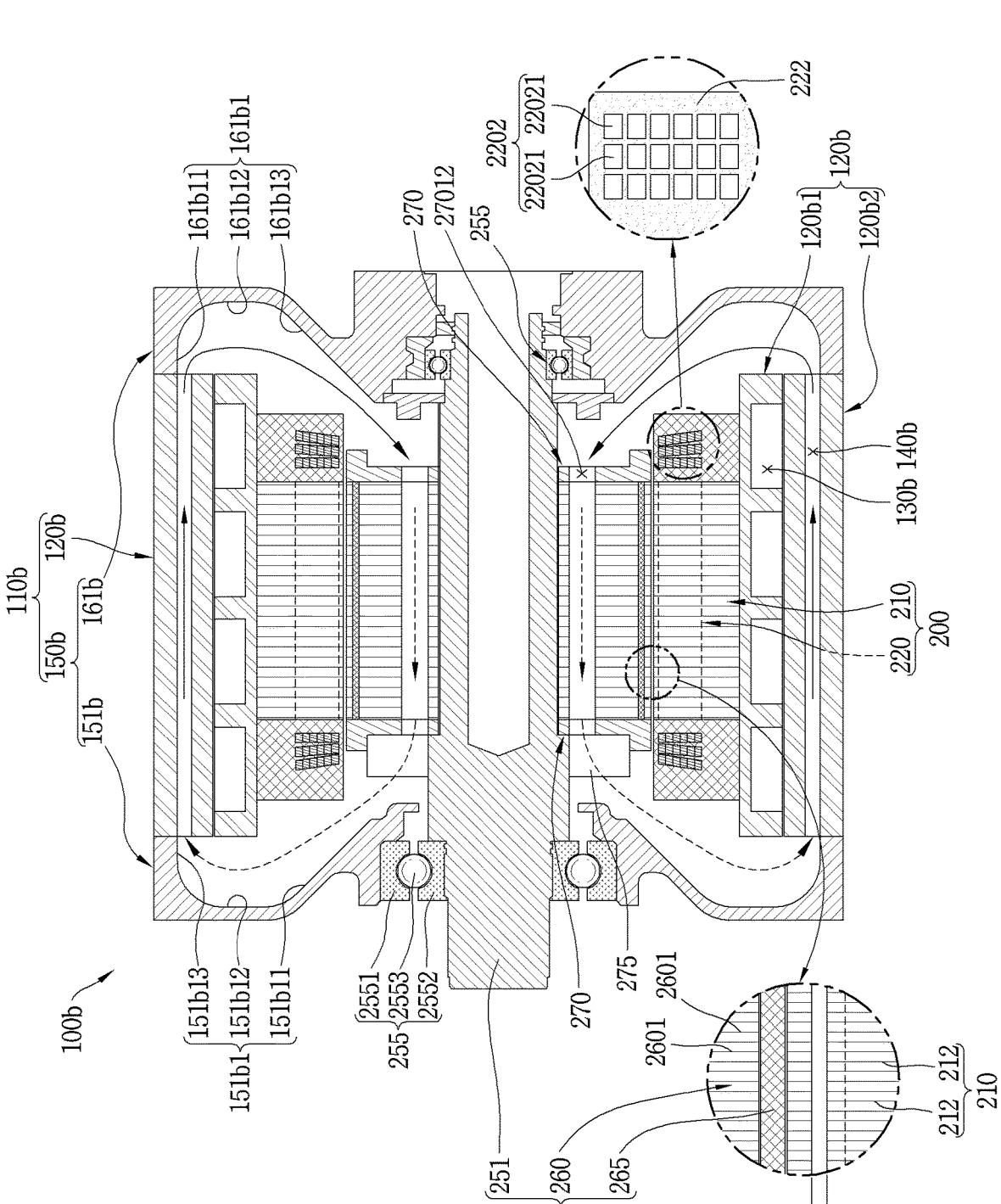
FIG. 17 is a cross-sectional view of a motor assembly in accordance with another embodiment of the present disclosure.
Figure 18:
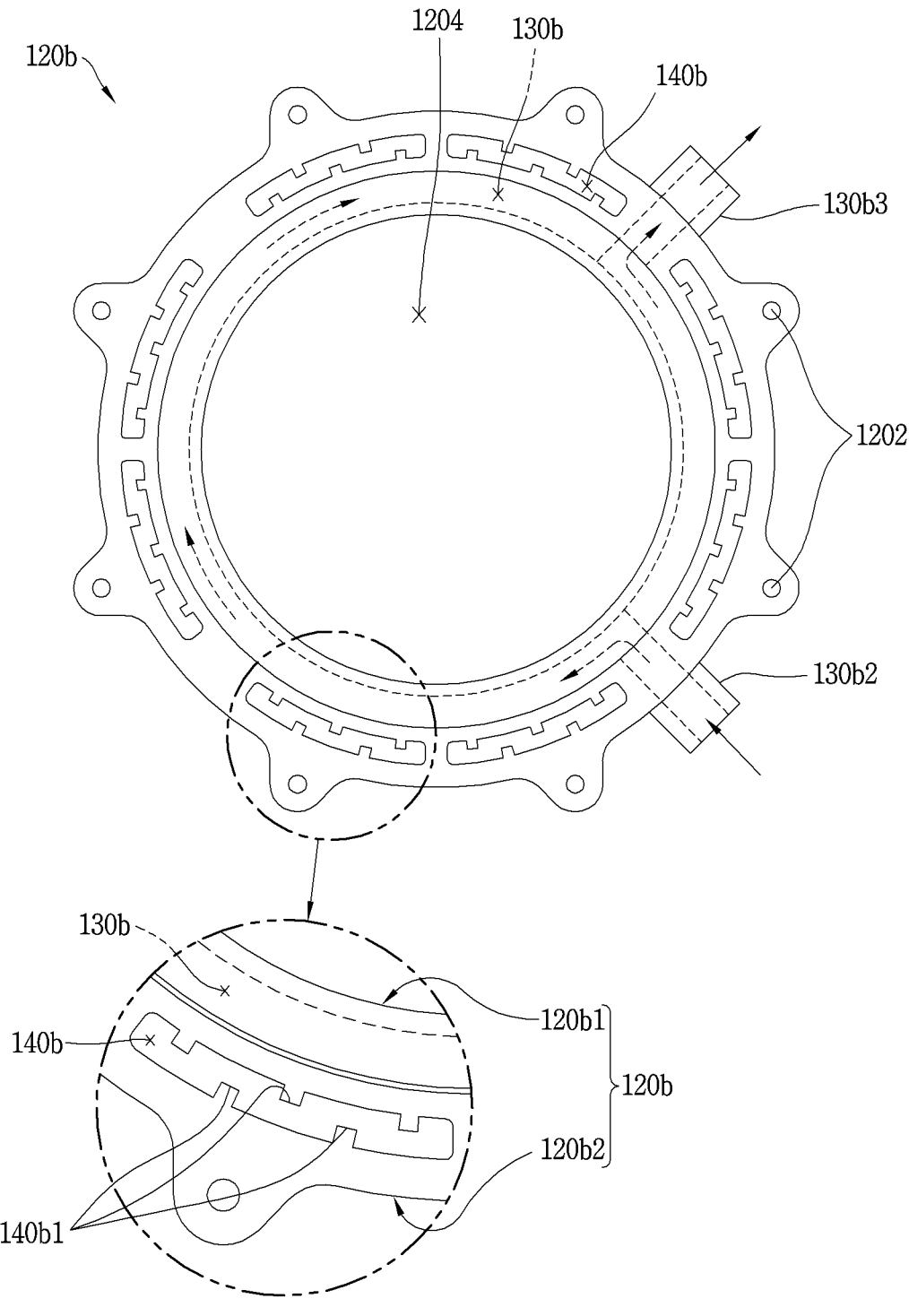
FIG. 18 is a cross-sectional view of a housing of FIG. 17.
Figure 19:
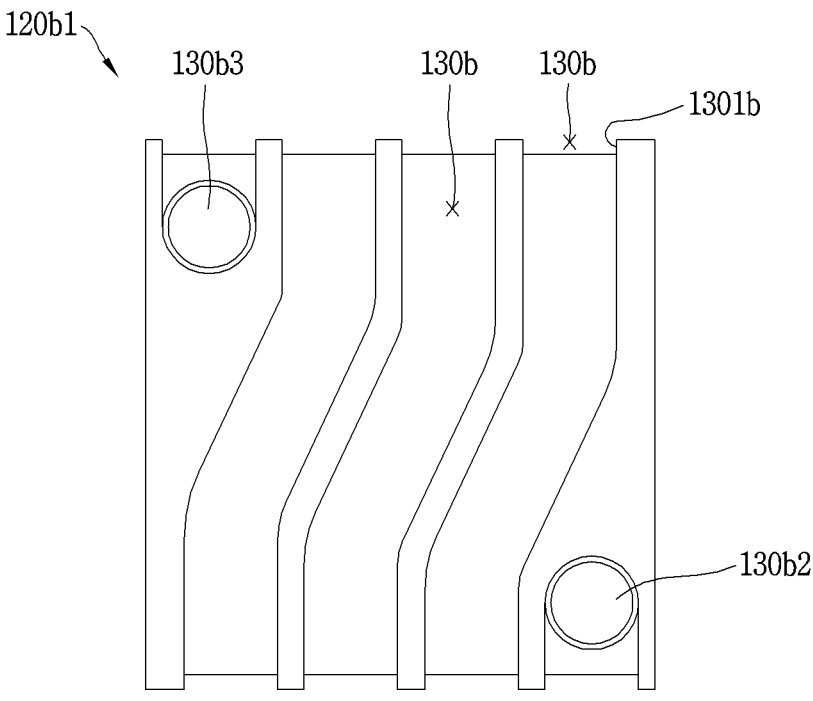
FIG. 19 is a view illustrating an outer surface of an inner housing of FIG. 17.

FIG. 17 is a cross-sectional view of a motor assembly in accordance with another embodiment of the present disclosure, FIG. 18 is a cross-sectional view of a housing of FIG. 17, and FIG. 19 is a view illustrating an outer surface of an inner housing of FIG. 17.

As illustrated in FIG. 17, a motor assembly 100*b* according to another embodiment of the present disclosure includes a housing 110*b*, a stator 200, and a rotor 250.

The housing 110*b* includes a housing body 120*b* in which an accommodation space 1204 is defined, and covers 150*b* coupled to both end portions of the housing body 120*b*, respectively. The covers 150*b* includes, for example, a front cover 151*b* coupled to one end portion (front end portion) of the housing body 120*b* and a rear cover 161*b* coupled to a rear end portion of the housing body 120*b*.

The stator 200 may include a stator core 210 and a stator coil 220 wound around the stator core 210. The stator core 210 is formed by stacking a plurality of electrical steel sheets 212 in an insulating manner. Each of the electrical steel sheets 212 of the stator core 210 has a rotor accommodating hole 2121 in a center thereof such that the rotor 250 is rotatably accommodated.

The stator coil 220 includes coil ends 2202 protruding respectively from both end portions of the stator core 210 along the axial direction. A molded part 222 formed of a thermal conductive member is disposed on a circumference of each of the coil ends 2202. Here, since the molded part 222 is filled between wires of the coil end 2202, a direct contact of the wires of the coil end 2202 with air can be remarkably suppressed. As a result, thermal energy generated in the coil end 2202 can be quickly transferred to the molded part 222 to be dissipated, thereby significantly suppressing an excessive temperature rise of the coil end 2202.

The rotor 250 includes a rotational shaft 251, a rotor core 260 coupled to the rotational shaft 251, and a plurality of permanent magnets 265 disposed on the rotor core 260. The rotor core 260 includes a rotational shaft hole 261 into which the rotational shaft 251 is inserted. A plurality of permanent magnet insertion parts 262 into which the plurality of permanent magnets 265 is inserted in the axial direction is formed through the rotor core 260. The rotor core 260 includes a plurality of penetrating parts 263 formed therethrough along the axial direction.

The rotor 250 includes end rings 270 respectively coupled to both end portions of the rotor core 260 in the axial direction. Each of the end rings 270 includes a plurality of communicating portions 27012 communicating with the plurality of penetrating parts 263. The end ring 270 is provided with a plurality of blades 275 that promote movement of air when the rotor 250 rotates. Each of the plurality of blades 275 may include, for example, a pressing surface 2751 by which air is pressed to move in the axial direction during the rotation of the rotor 250.

On the other hand, the housing 110b has therein a cooling water passage 130b in which cooling water exchanges heat while flowing therethrough, and an air flow passage 140b in which air inside the accommodation space 1204 exchanges heat while moving through the housing 110b.

In an embodiment of the present disclosure, the housing body 120b includes an inner housing 120b1 having an accommodation space 1204 defined inside thereof and the cooling water passage 130b defined outside, and an outer housing 120b2 concentrically coupled to be in surface contact with an outer surface of the inner housing 120b1 and having the air flow passage 140b defined therein.

In the embodiment of the present disclosure, the front cover 151b and the rear cover 161b may be coupled to be in surface contact with the outer housing 120b2 but not to be in contact with the inner housing 120b1

An air guide part 151b1 for guiding air movement is disposed in the inner surface of the front cover 151b. The air guiding part 151b1 of the front cover 151b includes an inclined section 151b11 inclined outwardly from the center of the front cover, a radial section 151b12 extending from the inclined section 151b11, and an axial section 151b13 extending toward the axial direction from the radial section 151b12.

Accordingly, air moved from the rotor 250 can smoothly move to an outer area of the outer housing 120b2.

An air guide part 161b1 for guiding air movement is disposed in the inner surface of the rear cover 161b.

The air guide part 161b1 of the rear cover 161b includes an axial section 161b11 extending axially from an end portion of the outer housing 120b2, a radial section 161b12 extending radially from the axial section 161b11, and an inclined section 161b13 inclined from the radial section 161b12 toward the center of the rear cover.

Accordingly, air discharged from the end portion of the outer housing 120b2 can smoothly move to an outer area of the rear of the rotor 250.

The movement of air inside the housing 110b is promoted by the plurality of blades 275, and guided by the air guide part 151b1 of the front cover 151b and the air guide part 161b1 of the rear cover 161b, which can allow the air to smoothly circulate inside the housing 110b.

As illustrated in FIG. 18, the inner housing 120b1 is formed in a cylindrical shape defining the accommodation space 1204 therein. The outer housing 120b2 is concentrically coupled to be in surface contact with the outside of the inner housing 120b1. This can facilitate heat exchange between the inner housing 120b1 and the outer housing 120b2.

The stator 200 is coupled to the inside of the inner housing 120b1. An outer surface of the stator core 210 is in surface contact with the inner surface of the inner housing 120b1. This can facilitate heat exchange between the inner housing 120b1 and the outer housing 120b2.

The outer housing 120b2 includes a plurality of air flow passages 140b penetrating therethrough in the axial direction.

The plurality of air flow passages 140b of the outer housing 120b2 is spaced apart from one another in the circumferential direction. This can significantly increase a heat exchange cross-sectional area of the plurality of air flow passages 140b.

The outer housing 120b2 includes a plurality of fastening member accommodating parts 1202 that protrudes outward in the radial direction and is spaced apart along the circumferential direction.

A plurality of ribs 140b1 that protrudes along the radial direction is disposed in each of the plurality of air flow passages 140b. This can increase a heat exchange area of the outer housing 120b2 to exchange heat with the air passing therethrough.

Specifically, the plurality of ribs 140b1 protrudes from inner and outer surfaces of each of the plurality of air flow passages 140b.

The plurality of ribs 140b1 that protrudes from the inner and outer surfaces of the air flow passage 140b may be alternately disposed in the circumferential direction.

As illustrated in FIG. 19, the cooling water passage 130b may be formed spirally around the outer surface of the inner housing 120b1. The cooling water passage 130b may be recessed from the outer surface of the inner housing 120b1 in the radial direction and extend spirally.

The cooling water passage 130b has an outer opening 1301b that is open outward in the radial direction of the inner housing 120b1.

The outer opening 1301b of the cooling water passage 130b is blocked by the inner surface of the outer housing 120b2.

Accordingly, since the cooling water and the inner surface of the outer housing 120b2 are in direct contact with each other, heat exchange between the cooling water and the outer housing 120b2 can be promoted.

A cooling water inlet 130b2 through which the cooling water flows in is formed through one end portion of the cooling water passage 130b.

A cooling water outlet 130b3 through which the cooling water flows out is formed through another end portion of the cooling water passage 130b.

With this configuration, when an operation starts, power is applied to the stator coil 220, and the rotor 250 rotates centering on the rotational shaft 251 by interaction between the magnetic field of the permanent magnet 265 and the magnetic field formed by the stator coil 220.

When the operation starts, cooling water may be introduced into the cooling water passage 130b and circulated. Accordingly, the inner housing 120b1 can be cooled.

On the other hand, when the rotor 250 rotates, air inside the housing 110b may circulate inside the housing 110b by the plurality of blades 275 of the rotor 250. The air moved to the front cover 151b by the plurality of blades 275 moves along the air flow passage 140b of the outer housing 120b2 so as to be cooled through heat exchange with the outer housing 120b2. The cooled air is then discharged to the inner rear area of the housing 110b. Accordingly, the air inside the housing 110b can be maintained below a preset temperature or less.

The cooled air discharged to the inner rear area of the housing 110b is brought into contact with the stator 200 and the rotor 250 and cools the stator 200 and the rotor 250. Specifically, the cooled air partially flows into the air gap G between the stator 200 and the rotor 250 to cool the stator 200 and the rotor 250, and partially flows into the penetrating part 263 of the rotor 250 and moves along the axial direction to cool the rotor core 260. This can suppress a temperature rise of the rotor 250.

As described above, in the motor assembly 100*b* according to the embodiment of the present disclosure, the housing 110*b* includes the inner housing 120*b*1 having the cooling water passage 130*b* and the outer housing 120*b*2 concentrically coupled to be in surface contact with the outside of the inner housing 120*bb*1 and having the air flow passage. This can allow air inside the housing 110*b* to be maintained at a preset temperature or less.

Specifically, for example, in the motor assembly 100*b* according to the embodiment of the present disclosure, it is measured that the stator coil 220 is 142.9° C., the stator core 210 is 131.8° C., and the rotor core 260 and permanent magnet 265 are equally 115.8° C., and a significantly reduced temperature is maintained compared to the case where the housing 110*b* (housing body 120*b*) is provided with only the cooling water passage.

Accordingly, in the motor assembly 100*b* according to the embodiments of the present disclosure, the use of high-priced heavy rare earth elements, which are typically added for the permanent magnet 265 of the rotor 250 to maintain high coercive force at a high temperature, can be excluded, or the usage amount of the expensive heavy rare earth elements can be significantly reduced. This can result in remarkably reducing a manufacturing cost of the permanent magnets 265.

The foregoing description has been given of specific embodiments of the present disclosure. However, since the present disclosure can be embodied in various forms without departing from the essential characteristics, the embodiments described above should not be limited by the specific contents for carrying out the invention.

In addition, even embodiments not listed in the foregoing detailed description should be broadly construed within the scope of the technical idea defined in the appended claims. And, all changes and modifications included within the technical range of the claims and their equivalents should be embraced by the appended claims.

The invention claimed is:

1. A motor assembly, comprising:
a housing defining an accommodation space therein;
a stator disposed inside the housing; and
a rotor disposed to be rotatable relative to the stator,
wherein the housing comprises:
cooling water passages through which cooling water moves for heat exchange; and
air flow passages through which air from the accommodation space is moved in an axial direction for heat exchange, and
wherein the housing comprises:
a housing body with opposing open sides and provided with the cooling water passages and the air flow passages; and
covers respectively coupled to the open sides,
wherein the air flow passages are spaced apart from each other along a circumferential direction of the housing body, and
wherein the cooling water passages extend through the housing body in the axial direction, and the cooling water passages and the air flow passages are alternately disposed along the circumferential direction of the housing body.

2. The motor assembly of claim 1, wherein the cooling water passages and the air flow passages are spaced apart from each other along a same circumference, and
the housing body includes an inner wall defining the accommodation space, an outer wall concentrically spaced apart from an outer side of the inner wall, and a plurality of barrier ribs connecting the inner wall and the outer wall.

3. The motor assembly of claim 2, wherein each of the cooling water passages includes a first section through which cooling water moves axially in a first direction and a second section through which the cooling water moves in a second direction opposite to the first direction,
wherein the first section and the second section are disposed adjacently and separated by the barrier rib interposed therebetween, and
wherein the covers include:
a front cover having a first return part to allow the cooling water from the first section to move into the second section; and
a rear cover having a second return part to allow the cooling water from the second section to move into a next first section.

4. The motor assembly of claim 3, wherein the air flow passage is disposed between the second section and the next first section along the circumferential direction of the housing body.

5. The motor assembly of claim 4, wherein the first return part includes a first section communicating portion communicating with the first section, a second section communicating portion communicating with the second section, and a connecting portion connecting the first section communicating portion and the second section communicating portion, and
wherein the second return part includes a second section communicating portion communicating with the second section, a first section communicating portion communicating with the next first section, and a connecting portion connecting the second section communicating portion and the first section communicating portion.

6. The motor assembly of claim 5, wherein the connecting portion of the second return part has a convex cross-sectional shape to accommodate a position of an air flow passage.

7. The motor assembly of claim 5, wherein:
a plurality of first sections and a plurality of second sections are alternately disposed along a circumference of the housing,
a cooling water inlet for inflow of the cooling water is disposed at an end portion of a first section connected to a foremost first return part among a plurality of first return parts, and
a cooling water outlet for outflow of the cooling water is disposed at an end portion of a second section connected to a last first return part among the plurality of first return parts.

8. The motor assembly of claim 1, wherein the rotor comprises:
a rotational shaft;
a rotor core coupled to the rotational shaft; and
permanent magnets disposed on the rotor core,
wherein the rotor core includes penetrating parts formed therethrough in the axial direction.

9. The motor assembly of claim 8, wherein the rotor core includes permanent magnet insertion parts formed therethrough in the axial direction to accommodate insertion of the permanent magnets, end rings disposed respectively on both end portions of the rotor core and configured to cover the permanent magnets, and wherein each of the end rings includes communication portions communicating with the penetrating parts.

10. The motor assembly of claim 9, wherein one of the end rings includes a plurality of blades to promote movement of air during rotation.

11. The motor assembly of claim 10, wherein the cover includes guide portions protruding from an inner surface thereof and extending in a radial direction.

12. The motor assembly of claim 8, wherein the stator includes:

a stator core; and a stator coil wound around the stator core, wherein the stator coil includes coil ends protruding from end portions of the stator core in the axial direction, and wherein each of the coil ends includes a molded part molded using a thermal conductive member.

\* \* \* \* \*